(12) United States Patent
Daniel

(10) Patent No.: US 9,723,000 B1
(45) Date of Patent: Aug. 1, 2017

(54) SYSTEM AND METHOD OF SECURING CONTENT

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/827,097

(22) Filed: Aug. 14, 2015

Related U.S. Application Data

(63) Continuation-in-part of application No. 13/891,146, filed on May 9, 2013, now Pat. No. 9,165,128.

(60) Provisional application No. 62/037,470, filed on Aug. 14, 2014.

(51) Int. Cl.
*H04L 29/06* (2006.01)

(52) U.S. Cl.
CPC ...... *H04L 63/0861* (2013.01); *H04L 63/0876* (2013.01); *H04L 63/123* (2013.01)

(58) Field of Classification Search
CPC .................. H04L 63/0861; H04L 63/0876
See application file for complete search history.

(56) References Cited

U.S. PATENT DOCUMENTS

| | | | | |
|---|---|---|---|---|
| 7,715,560 B2* | 5/2010 | Lai | ......... | H04M 1/677 380/252 |
| 2014/0106699 A1* | 4/2014 | Chitre | ......... | H04W 76/007 455/404.1 |

* cited by examiner

*Primary Examiner* — Dao Ho
(74) *Attorney, Agent, or Firm* — Alberto Interian, III

(57) ABSTRACT

The present invention relates generally to a system and method of securing content from on networked enabled communication devices wherein the user's identity is authenticated using a verification dongle with biometric technology, which upon verification a secure working environment is established, by closing the ports and effectively pausing the majority, if not all external tasks until the current secured task session is selectively completed by the user. Upon completion of the secured task session, the secure working environment is closed and the ports are reopened. In this manner, sensitive confidential and/or proprietary information may be edited and/or transmitted to a third party in a secure manner.

18 Claims, 20 Drawing Sheets

SYSTEM AND METHOD OF SECURING CONTENT

PRIORITY CLAIM

This patent application is a Continuation-in-Part patent application and claims priority under 35 U.S.C. §119(e), to U.S. Provisional Patent Application Ser. No. 62/037,470 titled "System and Method of Securing Content from Public Display with Biometric Authorization" filed Aug. 14, 2014 and U.S. Non-Provisional patent application Ser. No. 13/891,146 titled "A System And Method Of Securing Content From Public Display On A Mobile Communication Device" filed May 9, 2013. The entire disclosures of the afore-mentioned patent applications are incorporated by reference as if fully stated herein.

FIELD OF THE INVENTION

The present invention relates generally to a system and method of securing content from on networked enabled communication devices wherein the user's identity is authenticated using a verification dongle with biometric technology, which upon verification a secure working environment is established, by closing the ports and effectively pausing the majority, if not all external tasks until the current secured task session is selectively completed by the user. Upon completion of the secured task session, the secure working environment is closed and the ports are reopened. In this manner, sensitive confidential and/or proprietary information may be edited and/or transmitted to a third party in a secure manner.

DESCRIPTION OF THE PRIOR ART

Most networked enabled communication devices, e.g. cellular phones or tablets, have a wealth of information stored thereon, e.g. business contact information, private SMS text messages, confidential phone numbers, pictures, multimedia content and the like. In the event the networked enabled device is lost or stolen, all the stored confidential information is lost and may be misused if the networked enabled communication device falls into the wrong hands.

Although password protection is a common feature for networked enabled communication devices, owners do not always use that security feature. This might be due to the fact that password protection for networked enabled communication devices is often fragile systems, easily compromised allowing unauthorized disclosure of the private and/or confidential information. Further, data privacy is generally desired but not always accomplished with network enabled communication devices. Thus, there needs to be a system and method of interacting with data in a secure session and securing the information stored on networked enabled communication devices such that notwithstanding loss or theft, the information is inaccessible or hidden from unauthorized users.

This invention satisfies these long felt needs in a new and novel manner and solves the foregoing problems that the prior art has been unable to resolve.

SUMMARY OF THE INVENTION

The present invention relates generally to a system and method comprising of a networked enabled device that includes memory means; at least one processor disposed in communication with the memory means; and an application program executable by the at least one processor's computer executable instructions, and configured for performing any one or more of the following: receiving a command to hide at least one content of a data category within a hidden directory; storing and hiding the at least one content within the hidden directory, responsive to the command, into the hidden data category within the hidden directory by converting the at least one content into concealed data, unavailable for display on the displaying means unless an alternate command is received and user's identity is authenticated; displaying all content for the data category while excluding the concealed data for the data category from the display; revealing the concealed data when the display area substantially adjacent to a corresponding icon for the data category is engaged on the display screen and the user's identity is verified; encrypting any one or more of the following: at least one content or the data category; and/or receiving editing commands within the hidden directory to effectuate edits to the concealed data or the hidden data category.

In one embodiment of the invention, system and method comprises of a networked enabled device that includes memory means; at least one processor disposed in communication with the memory means; and an application program, stored in the memory means executable by the at least one processor's computer executable instructions, and configured for performing any one or more of the following: receiving a command to hide a data category from the display; storing and hiding the data category within a hidden directory, responsive to the command, by converting the data category into a hidden data category, unavailable for display on the displaying means unless an alternate command is received and user's identity is authenticated; displaying a plurality of data categories while excluding the hidden data category from the display; revealing the hidden data category when the display area is engaged on the display screen and the user's identity is verified; encrypting any one or more of the following: at least one content or the data category receiving editing commands within the hidden directory to effectuate edits to the concealed data or the hidden data category; and/or restoring the hidden data category from the hidden directory by reconverting the hidden data category to the displayable data category making it available for display.

System further may comprise of a dongle that include biometric verification module to authenticate the identity of the individual seeking to gain access to the networked enabled device. In some embodiments, the dongle comprises of hardware aspects, like biometric verification means removable or permanently affixed to the network enabled communication device, while in other embodiments, the dongle comprises of software aspects, e.g. an application program that includes electronic biometric verification software for reading and authenticating biometric samples and the like. The dongle is functional for its intended purposes when the dongle is attached to, or activated for use with the network enabled communication device.

In an exemplary embodiment, when the biometric sample is read, authenticating software scrambles the information that is read for the biometric sample and creates a random algorithm that may be converted to a one-time password that is automatically used to authenticate the individual. In some embodiments, the system will provide a green LED light to indicate authentication process has been properly completed and the user is authorized, while a red LED light may indicate unauthorized use and/or improper authentication procedure has been followed. Because the authenticating software requires a new random algorithm each time the user seeks access to the network enabled communication device, the system will provide a secure work environment for at least one or more tasks that become a secure work environment. The dongle is used to close all ports while the dongle is actively connected to the network enabled communication device until the subject task is completed.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
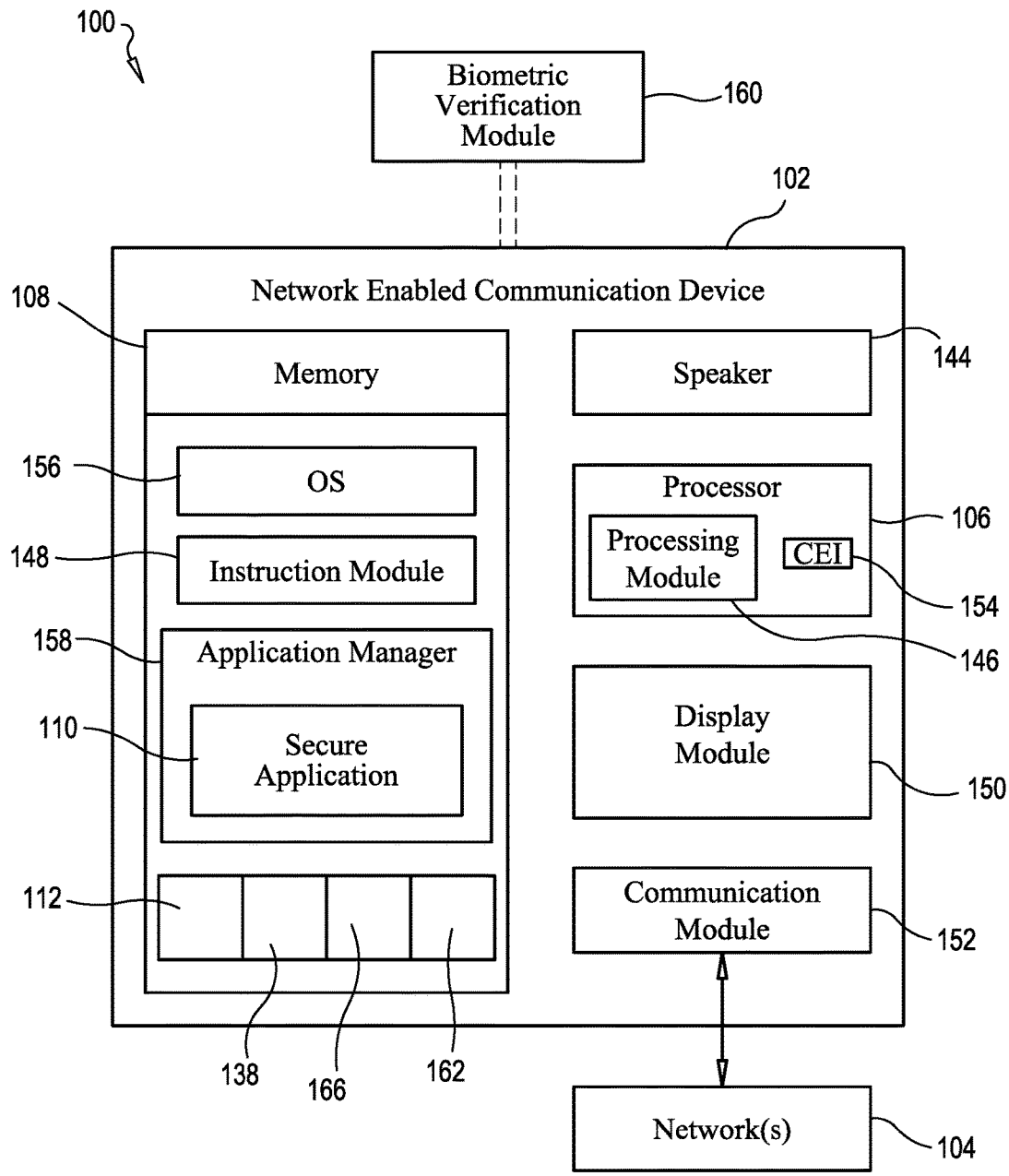
FIGS. 1A-1C are exemplary embodiments of the system according to one embodiment of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

The terms "connected," "electronically connected," "electronic connection," and the like, as used throughout the present disclosure with reference to electronic components, are intended to describe any kind of electronic connection or electronic communication, such as, but not limited to, a physically connected or wired electronic connection and/or a wireless electronic connection.

Systems

Figure 1B:
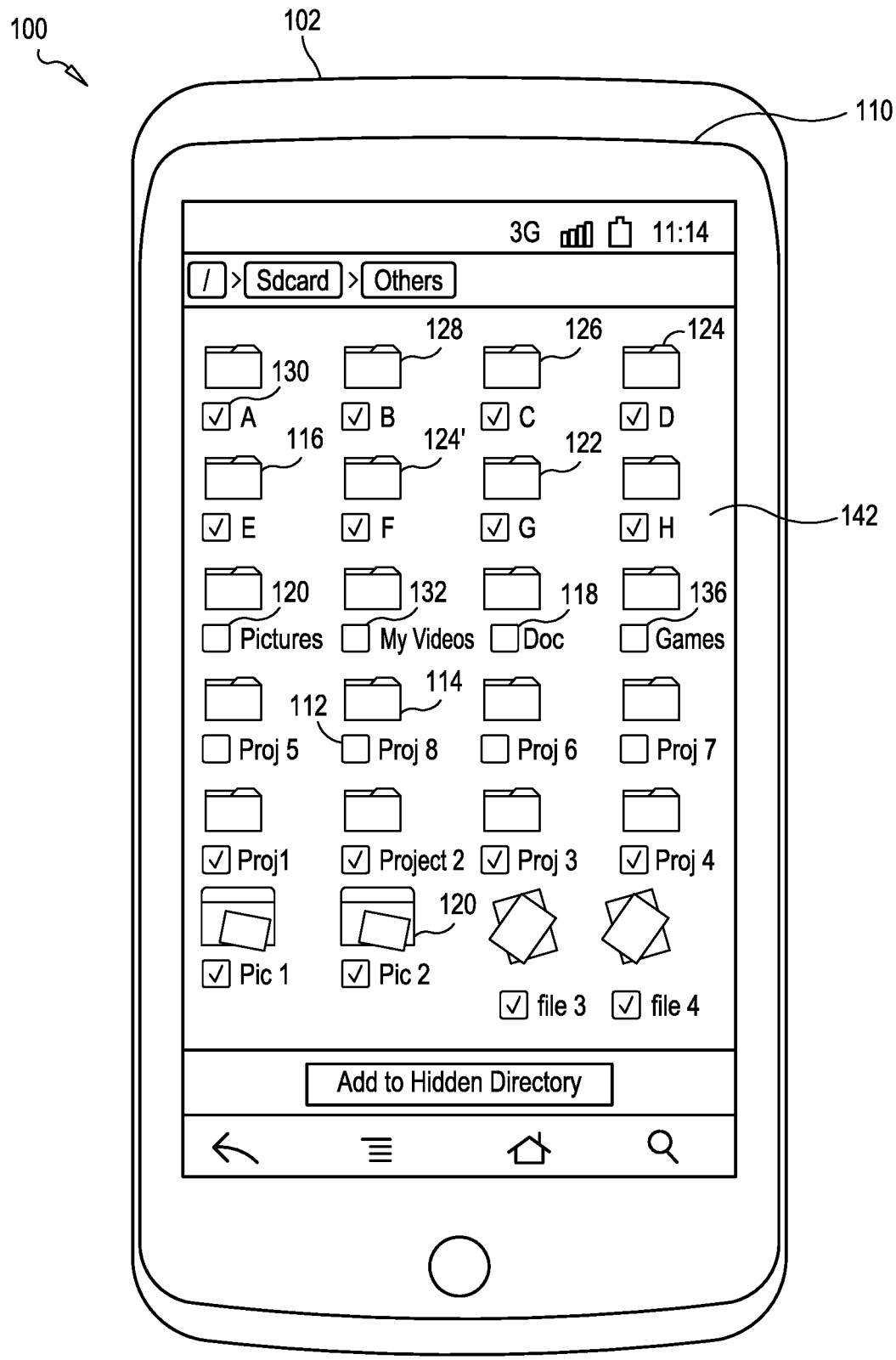
Figure 1C:
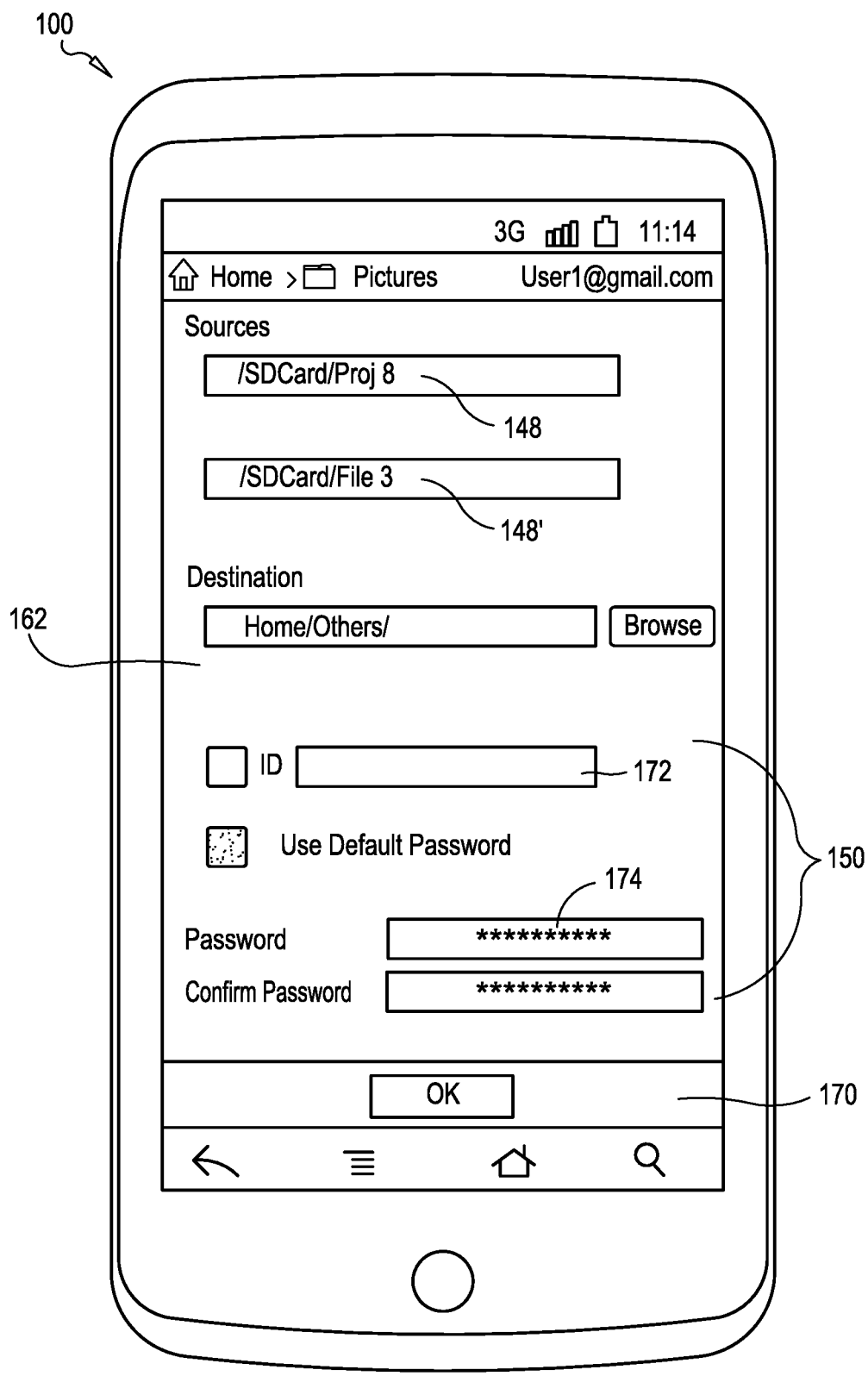

FIGS. 1A-1C are exemplary embodiments of the system according to one embodiment of the invention. Referring to FIG. 1A featuring the network enabled communication device 102 according to one embodiment of the invention. System 100 includes an exemplary networked enabled communication device 102 whereby device 102 may be any type of electronic computing device configured with means for communicating wirelessly and/or wired with other devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network 104.

Device 102 may include various hardware components, e.g. a computer central processor 106 and memory 108. Computer central processor 106 may be any type of processor, such as, but not limited to, a mobile device's processor, a server processor, a central processing unit (CPU), a microprocessor, a video processor, a front end processor, a coprocessor, a single-core central processor, a multi-core processor, and the like.

Computer processor 106 may be programmed to activate a software application program, i.e. secure application ("app") 110, for creating a secure session 111 (i.e. a secure environment where incoming and/or outgoing transmissions are either intercepted and/or disabled while session is active with user interaction and editing functions), cataloguing, encrypting and hiding at least one content 112 of a data category 114 (i.e. folders 116, 116', documents 118, 118', pictures 120, 120', SMS text messages 122, 122', contact listings 124, 124', other third party applications 110', 110'', emails 126, 126', calendar entries 128, 128', notes 130, 130', multimedia content 112 (e.g. videos 132, 132', music downloads 134, 134', games 136, 136'), downloaded data 138, 138', call logs 140, 140' or any other storable content 112 and the like) or the data category 114 itself, securing the privacy of the content 112 stored and viewable on the mobile communications device 102. Processor 106 may also be programmed to receive or prompt the user with instructions, which may be displayed on the display 142. In some embodiments, device 102 also includes a speaker 144 as are well known and used in the arts for broadcasting the various functions being performed, e.g. for the vision impaired.

Processor 106 may be operative to communicate electronically with the various modules disclosed herein and throughout the present disclosure, and the like. Said electronic communication may comprise any type of electronic communication, such as a network communication, a direct communication, an indirect communication, a wired communication, a wireless communication, and the like. Processor 106 includes a processing module 146 that may comprise of a hardware aspect such as a computer processor including, but not limited to, any of those previously described herein and throughout the present disclosure. In some embodiments, processing module 146 may comprise of a software aspect, such as, but not limited to, a computer program, such as an operating system, and the like. In yet another embodiment, processing module 146 may comprise both hardware and software aspects, such as those described directly above and elsewhere throughout the present disclosure. In some embodiments, processing module 146 may include software, e.g. computer software program, and hardware components to, for example, perform the system functions stated herein.

The term "module," as used throughout this disclosure, may refer to a unit of distinct functionality that may be presented in software, hardware, and/or combinations thereof. When the functionality of a module is performed in any part through software, the module includes a machine readable medium. In one embodiment of the invention, these computer modules may be self-contained computer hardware resident on at least one first computer processor 106, or resident on memory 108. In another embodiment of the invention, they may be computer hardware resident on a designated computer chip, chip component, separate computer chips, separate components, and/or any combination thereof. In yet another embodiment of the invention, the processor 106 may include a computer processing module 146, and an instruction module 148 that may be stored in memory 108, wherein the processing module 146 may be configured to perform others tasks not undertaken by the other modules. In yet another embodiment of the invention, the display module 150, instruction module 148, a communication module 152 and/or the various modules disclosed herein may all be in electronic communication with computer processing module 146 that comprises of computer executable instructions 154.

Memory 108 is either electrically or mechanically connected to its at least one computer processor 106. In the case of electronic connections, the electronic connections may be wired and/or wireless connections. Memory 108 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory 108 may be used to store content 112, including but not limited to instruction module 148, operating system 156, at least one content 112 of a data category 114, data categories 114, 114', concealed data 168, hidden data category 166, user authentication information, secure data generated during an active secure session 111 and the like. Information stored thereon may be retrieved from memory 108 using the computer processor 106.

Device 102 may include any kind of display 142, such as, but not limited to: a liquid crystal display ("LCD") screen, a light emitting diode ("LED") display, touchpad or touch screen display, and/or any other means known in the arts for emitting a visually perceptible output. Device's processor 106 is in electronic communication with its display 142. In other embodiments, display 142 is wirelessly connected to processor 106. Display 142 may include a control means, such as, but not limited to, a touch screen, keyboard, virtual keys, a stylus, and other input devices and the like. In some embodiments, display may be electronically connected to the device 102 according to the hardware and software protocols that are well known and used in the arts. Processor 106 controls the device's display 142, which is configured for displaying at least one or more content 112 located in a data category 114, and the like.

Device 102 is also equipped with the communication module 152 either electrically or mechanically connected to processor 106. In the case of electronic connections, the electronic connections may be wired and/or wireless. In some embodiments, communication module 152 may be a wireless communication module 152, which employ short range wireless protocol, such as, but not limited to, a radio frequency transceiver, a radio frequency receiver, and/or a radio frequency transmitter. At least one communication module 152 may include any type of communications means, including, but not limited to, a wireless communications means or wired communications means, such as a GSM modem, a WiFi module, a Bluetooth module, a ZigBee module, and any other type of communications means used to communicate directly with another device, or indirectly with another device, such as through a local or wide area network.

In yet another embodiment, at least one communication module 152 comprises a communications means for accessing a cellular network, such as a GSM network, a data network, such as a local data network, or a wide area data network, such as the Internet. In yet another embodiment, at least one communication module 152 comprises a communications means for accessing a web-enabled device, such as a Bluetooth module for accessing a web-enabled smartphone. Communication module 152 is operative to transmit or receive electronic communications, i.e. content 112, e.g. SMS text messages 122, 122', pictures 120, 120', documents 118, 118', multimedia content 112 and the like, via a short range wireless protocol, such as, but not limited to, a radio frequency receiver, a radio frequency transmitter, or a radio frequency transceiver. Communication module 152 is operative to issue a busy signal for the device 102 for all incoming calls to the device's service provider if the secure session 111 is active, intercept all transmitting commands and data being transmitted from the secure session 111 and providing notification via the device's display to user for confirmation of the cessation of the secure session 111; halting all transmitting functions by disabling the device's 102 ability to transmit data while the secure session is active; selectively transmitting secure data from the secure session 111 as approved by the user which effectively terminates the secure session 111; cease issuing a busy signal to all incoming calls if the secure session 111 is inactive; and/or resume all transmitting functions by enabling the device's 102 ability to transmit data if the secure session 111 has been deactivated.

Computer processor 106, positioned within the device 102, includes computer executable instructions 154, where the computer executable instructions 154 may be stored in the processing module 146 or in the instruction module 148, and are operative to perform all the necessary functions for the system 100 and methods disclosed herein, including but not limited to launching the secure app 110. Computer executable instructions 154 may be loaded directly on the device's processor 106, or may be stored in device's memory 108, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 154 may be any type of computer executable instructions 154, which may be in the form of a computer program, the program being composed in any suitable programming language or source code, such as C++, C, JAVA, JavaScript, HTML, XML, and other programming languages. Computer executable instructions 154 are operative to perform any and all the necessary functions for the system 100 and methods disclosed herein which may include launching the application program 110 on the at least one device 102.

Device 102 also includes software components that may be stored in the memory 108. Memory 108 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 102. Device 102 may also contain an input element for inputting data and an output element for displaying data. Also stored on the memory 108 may be an operating system 156, application manager 158, and the secure app 110.

Application manager 158 may include a browser, such as for use on the device 102 or a similar browsing device. Application manager 158 may be any type of software application, such as a standalone application designed to run on a mobile platform, such as a mobile device running an operating system 156, such as iOS™, Android™, Windows Mobile™, Blackberry™ and the like. Application manager 158 may be operative for an iPhone, any other "smart phone", mobile device, cellular phone, PDA, GPS or any other device 102 capable of handling transactions dealing with dynamic content, object, application, or software.

In some embodiments, application manager 158 may reside on a remote server (not shown) separate and distinct from device 102 and/or on the device 102, where the server computer may have a software program residing in memory 108. In another aspect of an embodiment of the present invention, application manager 158 may be downloadable to the device 102 from the remote server. For example, in one embodiment, application manager 158 may be on a mobile device (such as an iPhone, Blackberry, or other 'smart phone') while the full-sized software program may be on a remote server or computer, where communications may occur over a network or directly, either wired or wirelessly. Application manager 158 comprises of computer-executable components that operate in device 102 and may be implemented in a variety of ways. In one embodiment of the invention, application manager 158 may use one or more computer-executable components for interacting with the secure app 110. In another embodiment, secure app 110 is incorporated in application manager 158 to receive information from the input element, to communicate with, and/or to control the operations of secure app 110.

Secure app 110 may be an independent component or may be incorporated into the operating system 156. Secure app 110 is a computer-executable component readable and executable by the computer processor 106 and configured for performing any one or more of the following: receiving a command from an input device for selective launch of the secure app 110 from the user; generating a secure session 111 for user interaction by blocking all ports, if the user is authenticated by the biometric verification module 160 and the secure app 110 has been selectively activated; and/or enabling the communication module 152 to: issue a busy signal for the network enabled communications device 102 for all incoming calls to the network enabled communications device's cellular/telephone data service provider if the secure session 111 is active (even though the user is not engaged on a telephone call); intercept all transmitting commands and data being transmitted from the secure session 111 and providing notification via the device's display 142 to user for confirmation of the selective expiration of the secure session 111 if the transmission is permitted; and/or halt all transmitting functions by disabling the device's 102 ability to transmit data (including but not limited to data files, data transfers, voice calls, text messages and or other electronic communications) while the secure session is active.

Secure app 110 is further configured for performing all of the functions previously described in the parent U.S. Patent Application Ser. No. 62/037,470 titled "System and Method of Securing Content from Public Display with Biometric Authorization" filed Aug. 14, 2014 incorporated herein by reference as if fully restated herein, e.g. receiving an input command to hide at least one content 112 of a data category 114 within a hidden directory 162, wherein the input command may comprise of clicking an icon 164', touch, or applying pressure on a touch-screen display, audio or text commands and the like; storing and hiding the at least one content 112 in the respective hidden data category 166 within the hidden directory 162 responsive to the command, by converting the at least one content 112 into concealed data 168, unavailable for display on the display 142 unless an alternate command is received and user's identity authentication information is verified. An alternate command may include a counter command for hiding the at least one content 112, e.g. "Show" or "Display" provided in text, audio or using a drop down menu on the mobile device's display 142.

Secure app 110 is also configured for displaying all content 112 for the respective data category 114, where such content 112 includes all other content 112 with the exception of the at least one content 112 that was converted to concealed data 168. As such, secure app 110 is configured for displaying all content 112 for the respective data category 114, while excluding the concealed data 168 for the respective data category 114 from the display 142. Secure app 110 is also configured for revealing the presence of concealed data 168 when the display area 168 substantially adjacent to a corresponding icon 164 for the data category 114 is engaged on the display 142 and the user's authentication information is verified by any one or more of the following: login id, password and/or a biometric sample that is received and validated by the biometric verification module 160 with the at least one or more stored biometric identifiers, for example finger prints, retina scan, etc., to the extent the device 102 supports biometric verification technology.

Biometric verification module 160 may include at least one processor disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry for speech recognition and any other biometric verification means that are known and used in the arts. The at least one processor may be the device's processor or another processor of the type and kind previously described and further described herein, and is configured for processing at least one biometric sample, e.g. validating a biometric sample with the biometric identifier stored on the device 102 for an identical match. If the biometric sample fails to match the biometric identifier, e.g. where the device 102 is stolen, an unauthorized user will not be able to use the device to access the information stored thereon.

Secure app 110 may comprise in part of a browser, such as for use on the device 102, or a similar browsing device. Secure app 110 may be any type of software application, such as a standalone application designed to run on a mobile platform, such as a device running an operating system 156, such as iOS™, Android™, Windows Mobile™, Blackberry™, and the like. Secure app 110 may be operative for an iPhone, any other "smart phone", device, cellular phone, PDA, GPS or any other device 102 capable of handling transactions dealing with dynamic content, object, application, or software. In another embodiment, the app 110 may be designed to run on a social network platform, such as FACEBOOK™ or JUSTSYNC™. In some embodiments, secure app 110 may reside on a server and/or on a device 102, where the server computer may have a software program residing in memory. An exemplary client device 102' may have the secure app 110 residing in local memory or the secure app 110 and maybe downloadable to the client device 102' from the server. For example, in one embodiment, the secure app 110 may be on a device 102 (such as an iPhone, Blackberry, or other 'smart phone') and the full-sized software program may be on a server computer, where communications may occur over a network or directly, either wired or wirelessly. Computer includes but is not limited to a network enabled computer, a laptop or personal digital assistant subject to wired/wireless connectivity, which is configured with a computer processor 106.

In either embodiment, computer executable instructions 154 readable by computer processor 106, (i.e. the server's computer processor 106' or the device's processor 106) are operative to launch the secure app 110 for securing a session and any data created in the secure session 111 can further be placed into a hidden data category 162 on the device 102. The systems 100 and methods implemented herein provide for the device's display 142 to keep selected content 112 and/or a data category 114 to be excluded from the display 142, such that without user authentication, a non-authorized user will have no inkling that the selected content 112 and/or a data categories 114, 114 do exist.

Referring to FIGS. 1B and 1C, user may selectively launch and access the secure app 110 by an icon 164 (e.g., by touching a touchscreen, or selecting it using an input device, e.g. a pointing device, roller ball, arrow keys, or any other input device and/or other controller), the computer central processor's computer executable instructions 154 launches the secure app 110. Processor 106, which is electronically connected to the display 142, controls the display 142 to display the secure app 110 as launched on the at least one device's display 142. Once launched on the mobile communications device 102, the secure app 110 allows content 112 of a data category 114 (i.e. folders 116, 116', documents 118, 118', pictures 120, 120', SMS text messages 122, 122', contact listings 124, 124', other third party applications 110', 110'', emails 126, 126', calendar entries 128, 128', notes 130, 130', multimedia content 112, downloaded data 138, 138', call logs 140, 140' or any other storable content 112 and the like) or the data category 114 itself to be hidden from the display 142 on the device's display 142. In some embodiments, the data category 114 is represented by an icon 164 on the display 142.

Figure 2:
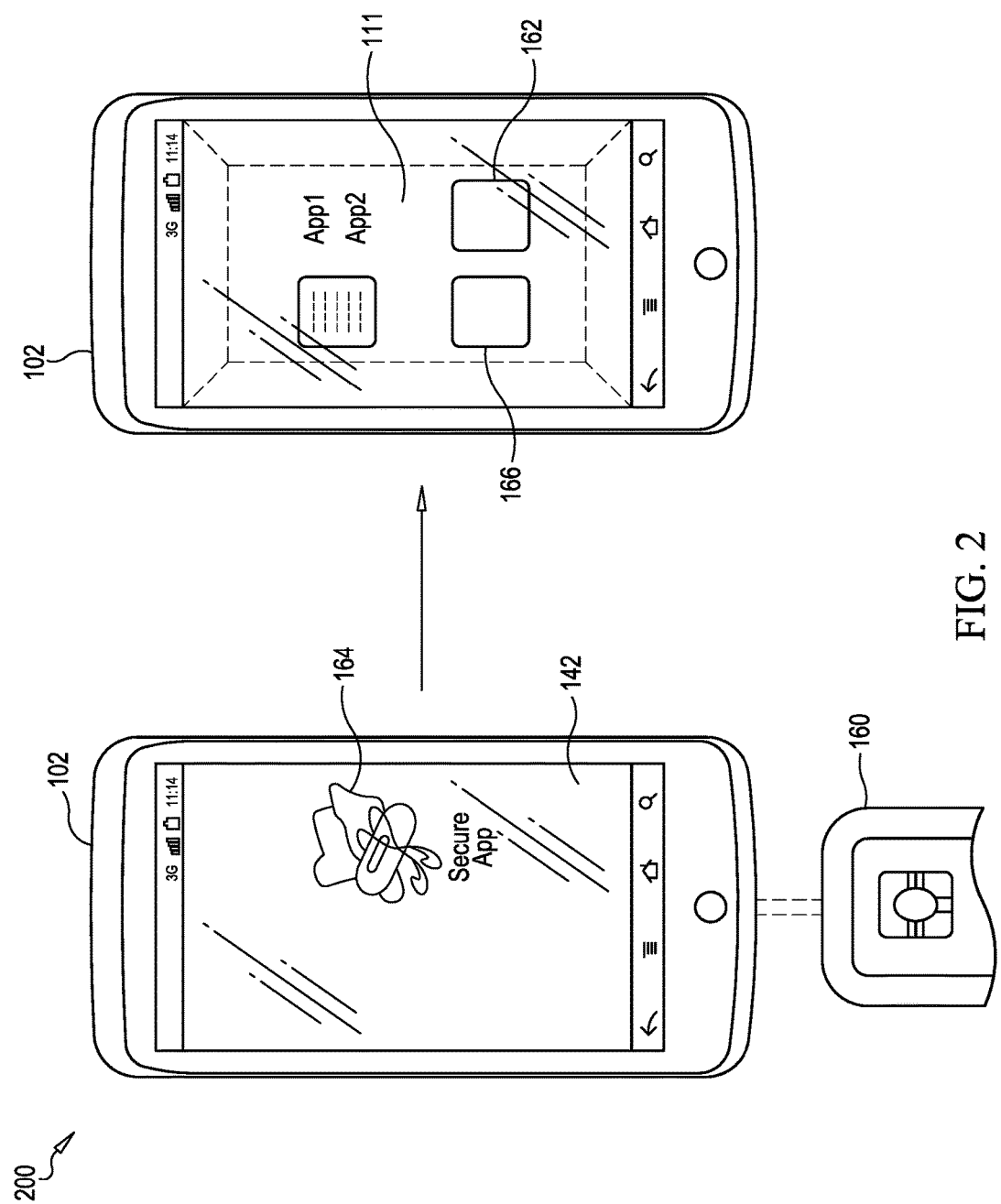
FIG. 2 is an exemplary embodiment of the system of the invention in use according to one embodiment.

FIG. 2 is an exemplary embodiment of the system 200 of the invention in use according to one embodiment. System 200 comprises of the device 102, which includes memory 108 positioned within, at least one processor 106 disposed in communication with the memory 108; a biometric verification module 160 configured for authenticating (receiving and validating) a user's biometric sample with a biometric identifier stored thereon; and the secure app 110, stored in the memory 108, readable and executable by the at least one processor's computer executable instructions 154. If the biometric verification module 160 fails to authenticate the user, the secure app 110 will not launch. However, once launched, secure app 110 is configured for performing any one or more of the following: receiving a command from an input device for selectively launching the secure app 110 from the user, causing the processing module 146 to generate a secure session 111 for user interaction by blocking all ports, effectively denying any incoming transmissions from entering to interrupt the secure session, if the user is authenticated by the biometric verification module 160 and the secure app 110 has been selectively activated.

In the secure session 111, user may access all programs, other software applications (apps), data, multimedia content, photographs and the like as well as effectuate edits (save, adding, deleting, copying, moving, play, rewind, pause, fast forward, and the like) to data, multimedia content and the like, in a secure environment uninterrupted by any incoming transmission that may contain malware and the like. Thus, it is the user who determines when the secure session 111 is selectively established and terminated.

Once the secure session is established, secure app 110 is configured for enabling the communications module 216 to issue a busy signal to the device's cellular/telephone data service provider, for the device 102 for all incoming calls if the secure session 111 is active; intercepting all transmitting commands and data being transmitted from the secure session 111 and providing notification via the networked enabled communication display to user for confirmation of the selective expiration of the secure session 111 if the transmission from the secure session 111 is allowed to be fully executed; and/or halting all transmitting functions by disabling the device's 202 ability to transmit data (including but not limited to data files, data transfers, voice calls, text messages and or other electronic communications) while the secure session is active, i.e. isolating the secure session 111 from any data interference.

In some embodiments, while the secure session 111 is active, incoming transmissions may be registered, recorded and/or buffered in memory 108 and/or may be stored on a cloud for accessibility once the secure session 111 is terminated. In this manner, the ports still register and record information concerning the incoming transmissions so that user is still apprised of any missed calls, texts and/or data.

Secure app 110 is further configured for performing any one or more of the following: enabling and receiving editing commands within the secure session 111 to effectuate edits to the secure data and storing and cataloguing the edited or unedited secure data as concealed data 168 within a hidden directory 162 in a hidden data category 166 that would otherwise correspond to the at least one content; enabling the communications module 216 for selectively transmitting secure data from the secure session 111, wherein a user may selectively opt to transmit edited/unedited data. However, if the user selects to transmit from the secure session 111, the secure app 110 is configured for terminating the secure session 111 and resuming all transmitting functions by enabling the device's 102 ability to transmit data if the secure session 111 has been deactivated. The secure session 111 may be selectively terminated upon the completion/cessation of any task being performed in the secure session 111. Nonetheless, the app 110 is configured for terminating the secure session 111 by unblocking all ports if the secure session 111 has been selectively deactivated by the user. In some embodiments, the secure session 111 is monitored for duration of the session and may be automatically terminated after a predetermined period, e.g. 10 hours.

Secure app 110 is further configured for enabling the communications module 216 to cease issuing a busy signal to the network enabled communications device 102 for all incoming calls if the secure session 111 is inactive, i.e. function in normal mode; and/or resuming all transmitting functions by enabling the device's 202 ability to transmit data if the secure session 111 has been deactivated.

Figure 3A:
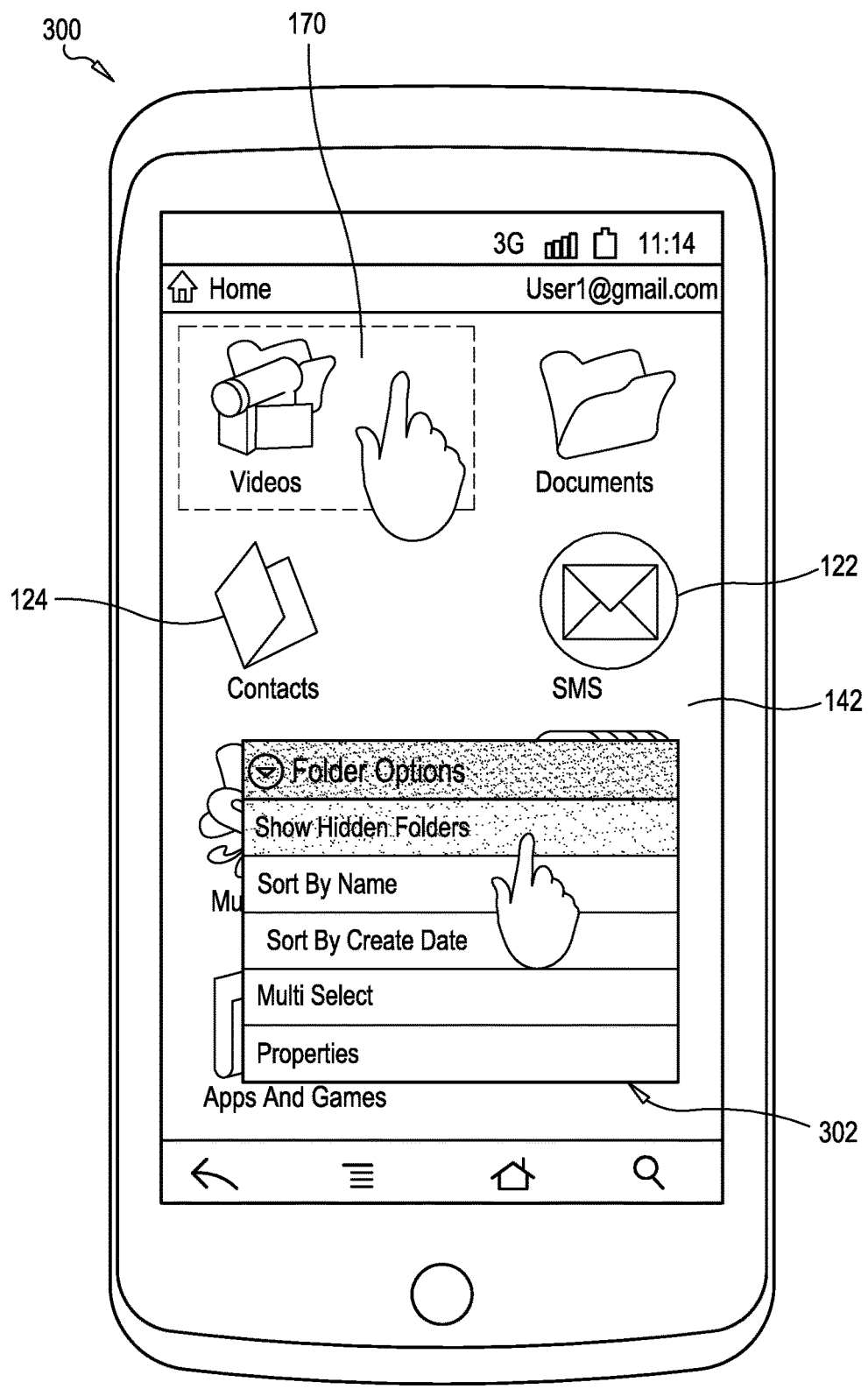
FIGS. 3A-3C are exemplary embodiments of the system of the invention in use according to one embodiment.
Figure 3B:
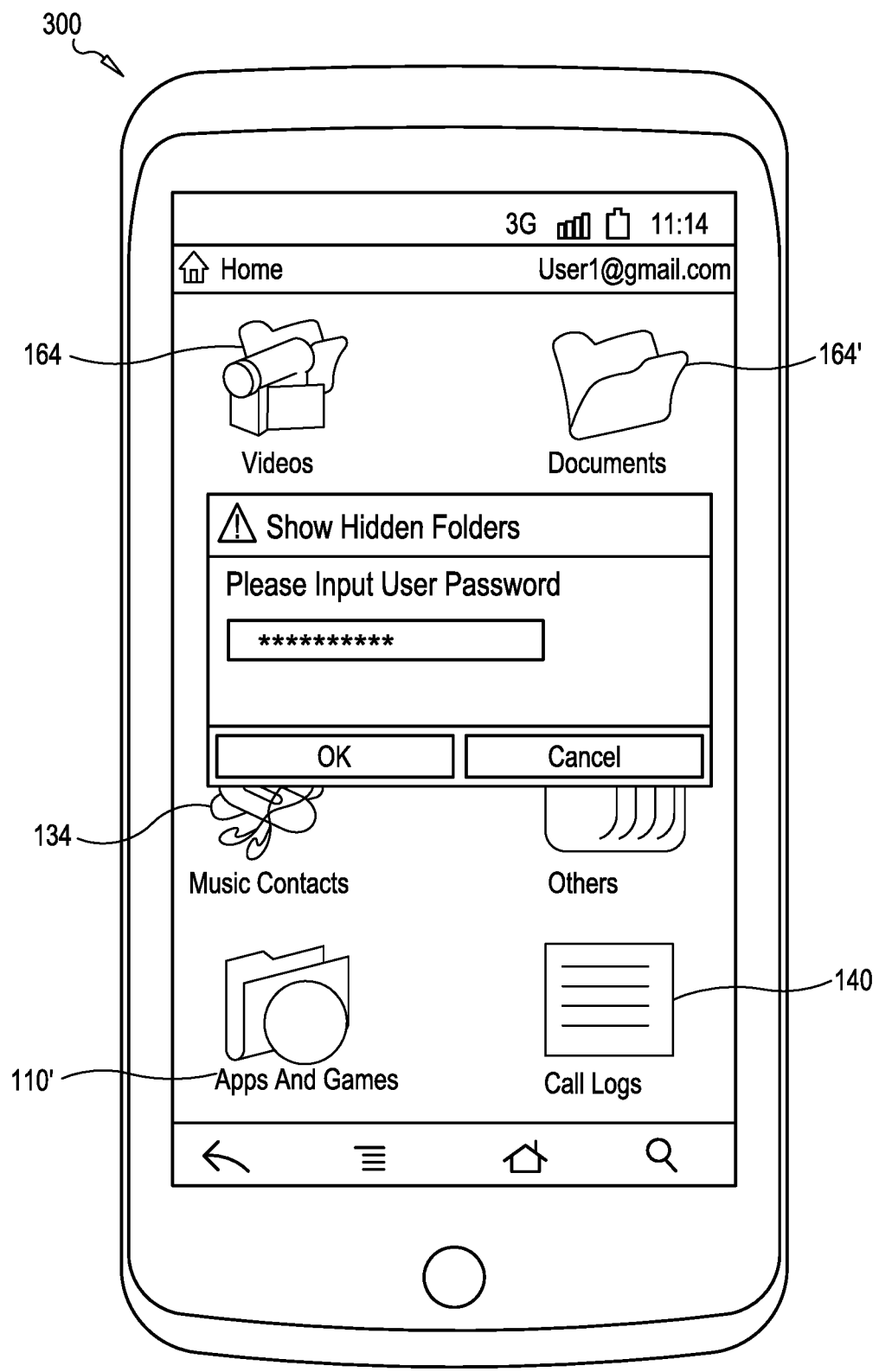
Figure 3C:
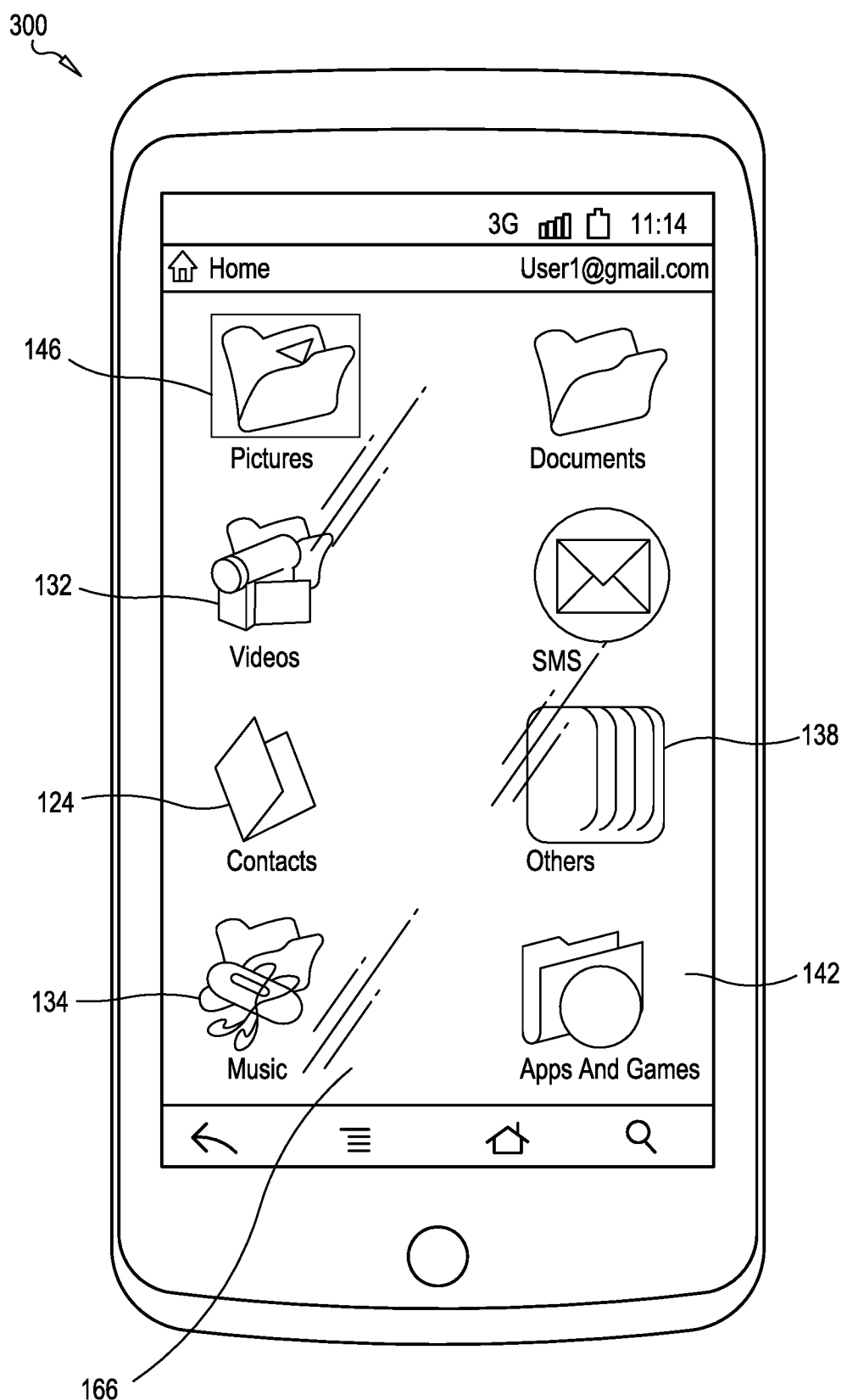

FIGS. 3A-3C are exemplary embodiments of the system 300 of the invention in use according to one embodiment. As previously discussed, once the secure data or data category 114 is converted to concealed data 168 and hidden data category 166, respectively, an unauthorized user will not have access to the concealed data 168 and/or hidden data category 166. However, upon valid user authentication, secure app 110 is configured for restoring the concealed data 168 or the hidden data category 166 from the hidden directory 162 by reconverting the concealed data 168 or the hidden data category 166 to the at least one content 112 or the data category 114, respectively making either available for display.

Figure 4A:
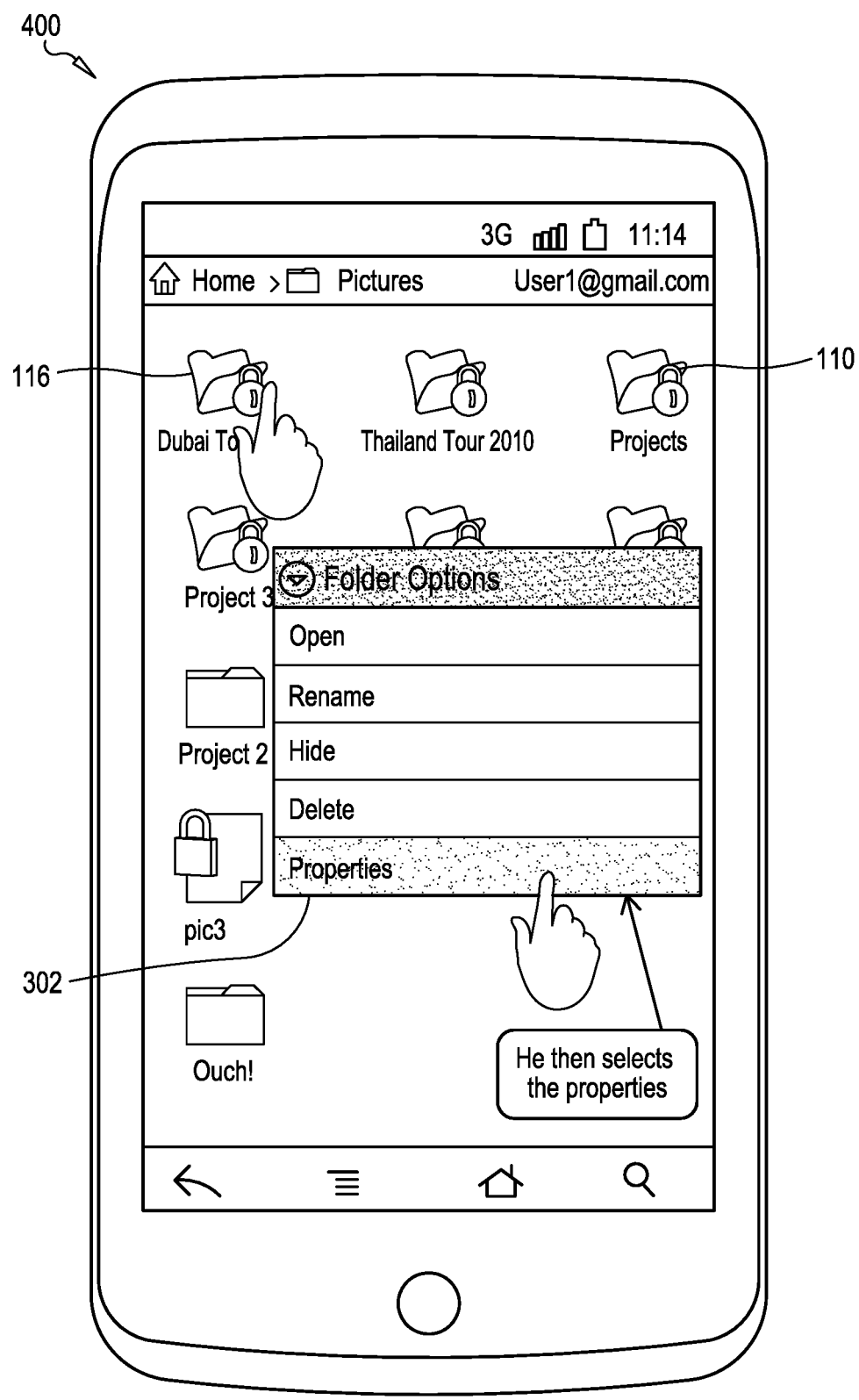
FIGS. 4A-4C are exemplary embodiments of the system of the invention in use according to one embodiment.
Figure 4B:
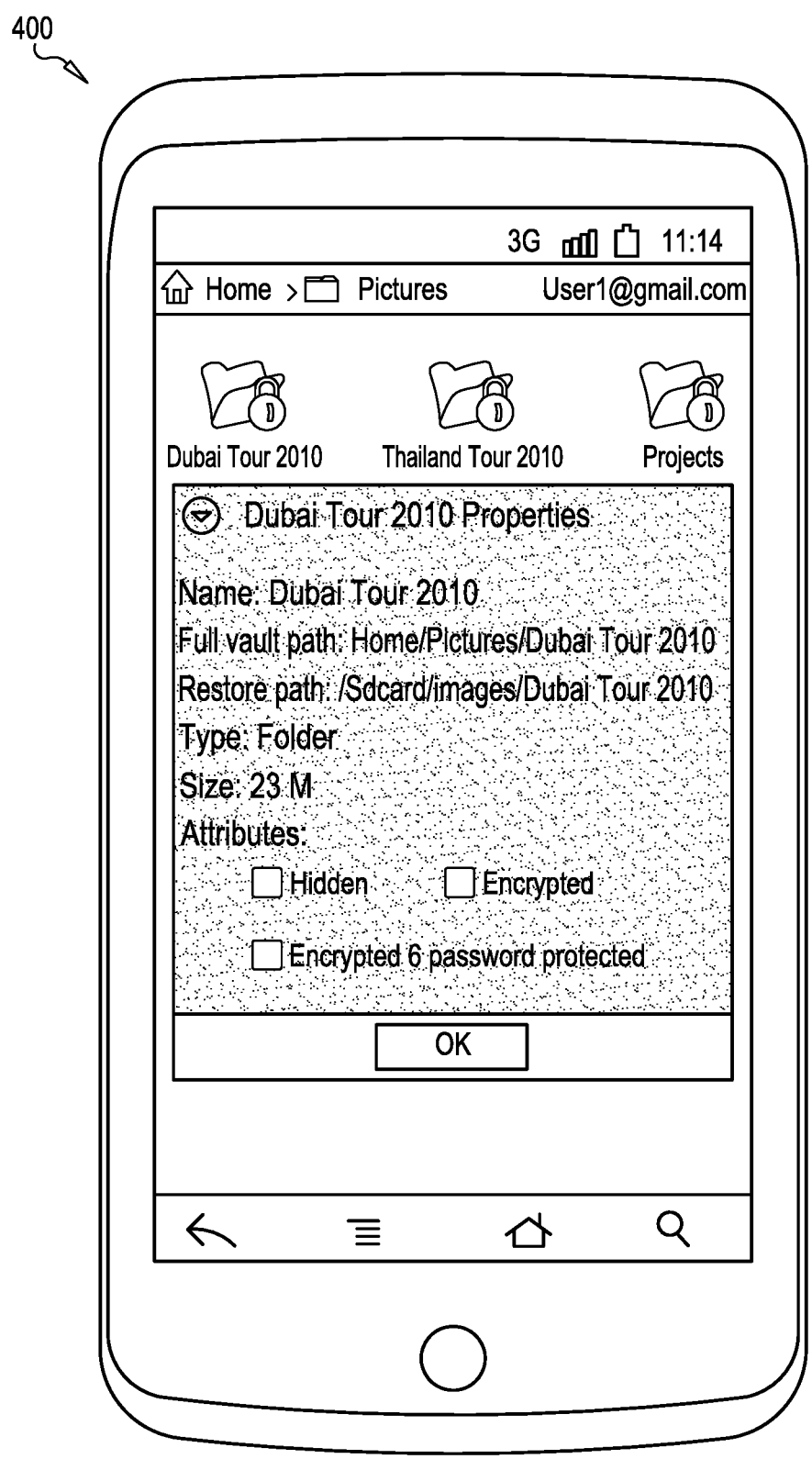
Figure 4C:
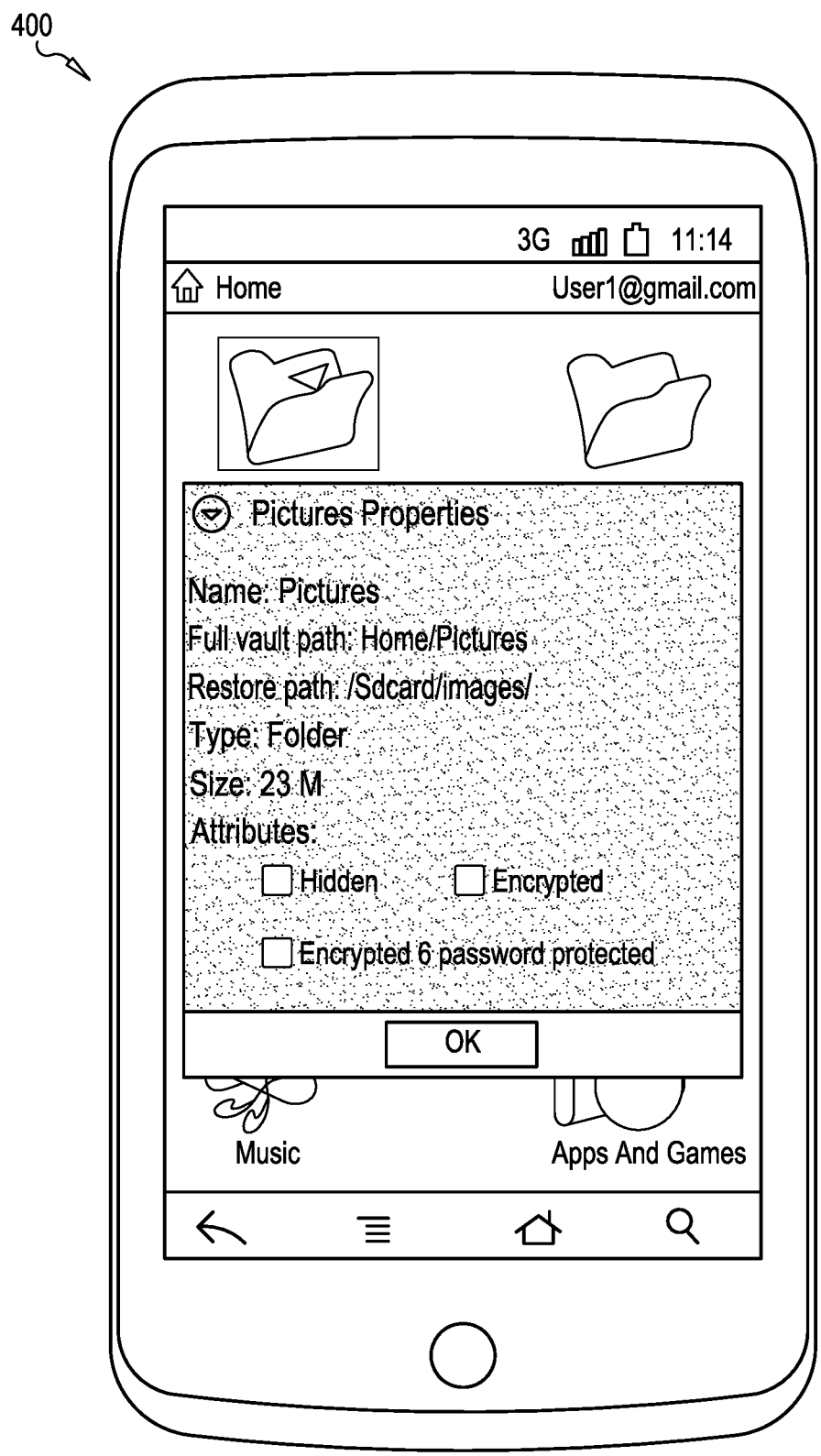

System 300 includes the secure app 110 that is configured for authenticating the user as being authorized to receive display of previously concealed data 168 by requiring for instance the user's authentication information 150. Once verified as correct as correct secure app 110 is configured for displaying all data content 112 for the corresponding data category 114 including the concealed data 168 on the device's display 142. As shown, the secure app 110 reveals the concealed data 168 when the display area 170 substantially adjacent to a corresponding icon 164 for the data category 122 is engaged on the display 142 and the user's authentication information, e.g. password is verified. As shown, by tapping the display 142, a drop down menu 302 (as shown on FIG. 3A) is displayed, wherein user may select the input command to e.g. hide at least one content 112 of a data category 114 to a hidden directory 162. Secret data app 110 is configured for storing and hiding the at least one content 112 in the respective hidden data category 148 within the hidden directory 162, FIG. 4A-4C are exemplary embodiments of the system 400 of the invention in use according to one embodiment. Secure app 110 is configured for encrypting any one or more of the following: at least one content 112 or the data category 114 as shown in FIG. 4, whereby the at least one content 112 may be encrypted which may require by authenticating the user's authentication information 150 with for instance a login id or password as authorized to issue an encryption command 160 for at least one content 112 or data category 114.

Figure 5A:
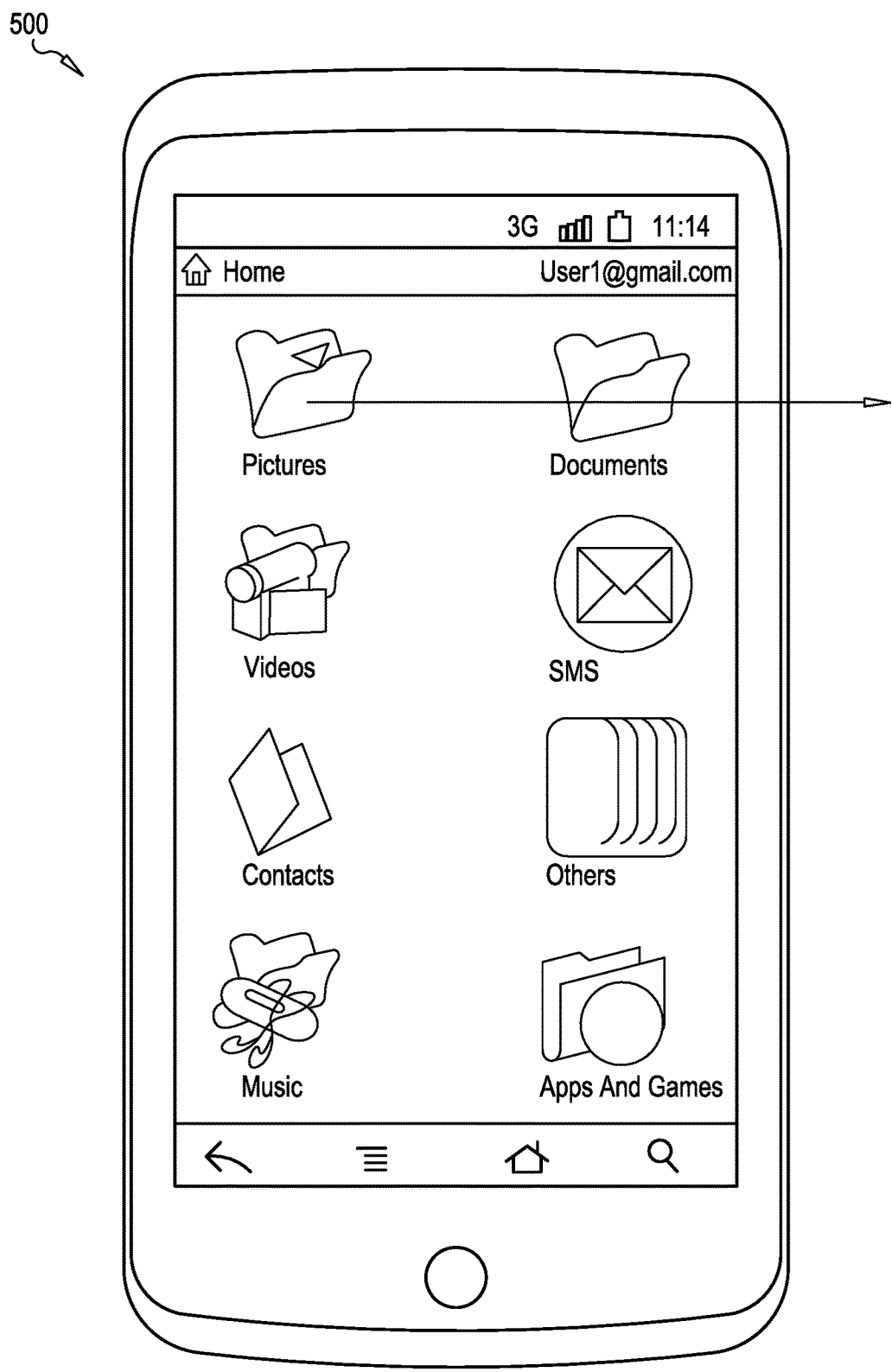
FIGS. 5A-5B are exemplary embodiments of the system of the invention in use according to one embodiment.
Figure 5B:
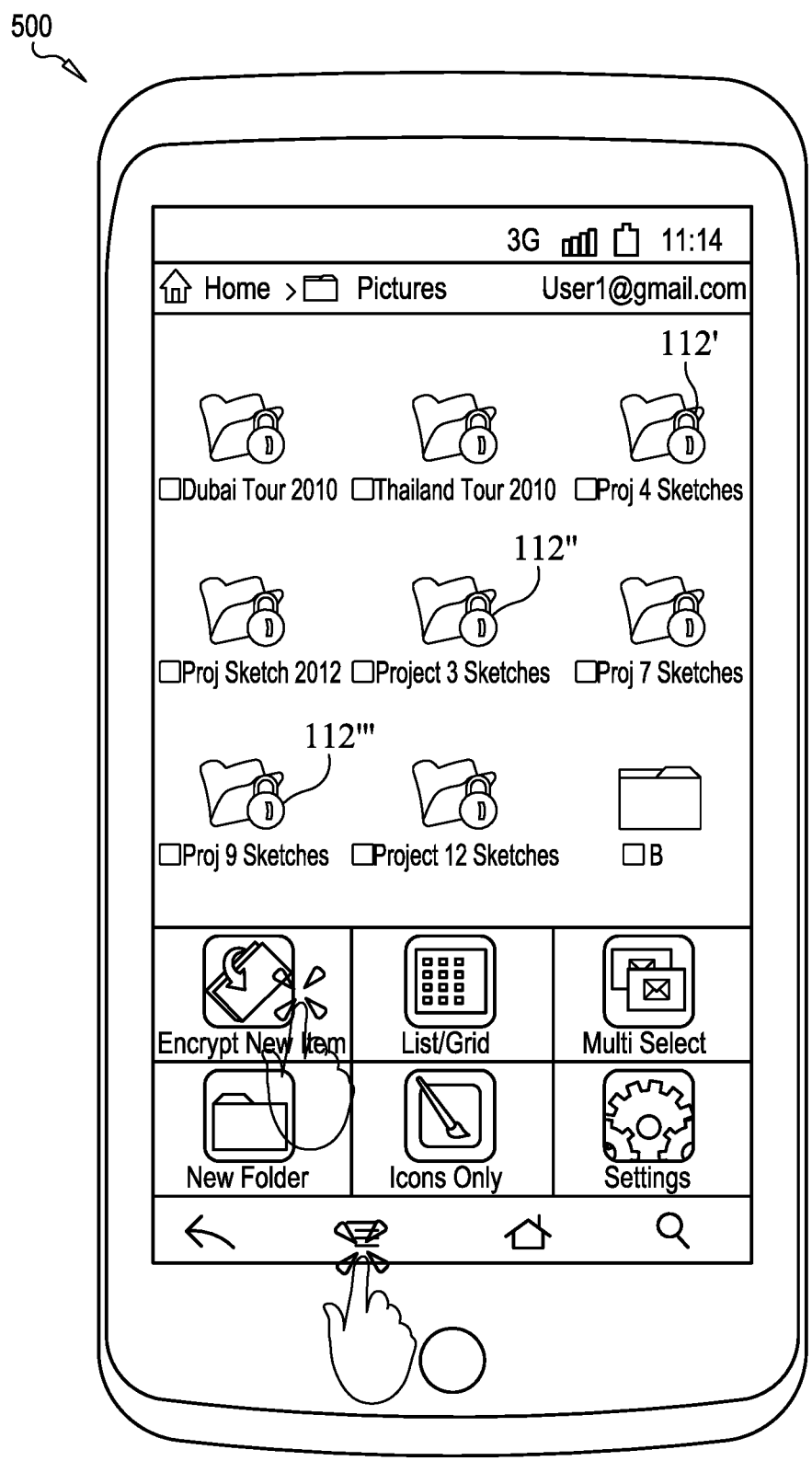

FIGS. 5A-5B are exemplary embodiments of the system 500 of the invention in use according to one embodiment. Secure app 110 is configured for storing encrypted at least one content 112' with other non-encrypted content 112', 112''' within its respective data category 114. Encrypting the at least one content 112 may be an option that the user exercises as opposed to hiding the at least one content 112 in a hidden data category 166 within the hidden directory 162. Notwithstanding, once the at least one content 112 is encrypted, to view the encrypted the at least one content 112', user will need to supply a valid login id and password so the secure app 110 can decrypt and display the at least one content 112.

Figure 6A:
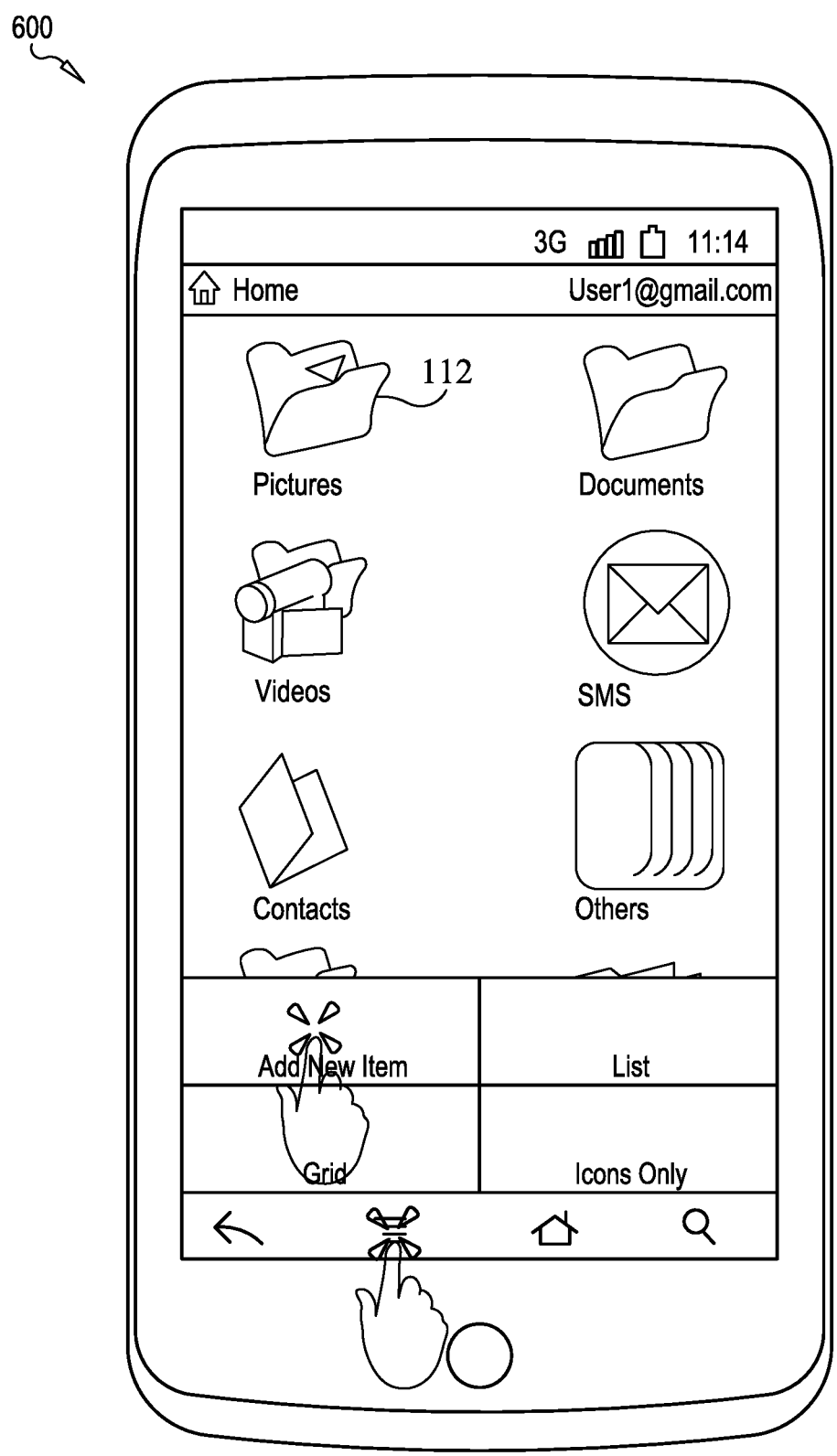
FIGS. 6A-6B are exemplary embodiments of the system of the invention in use according to one embodiment.
Figure 6B:
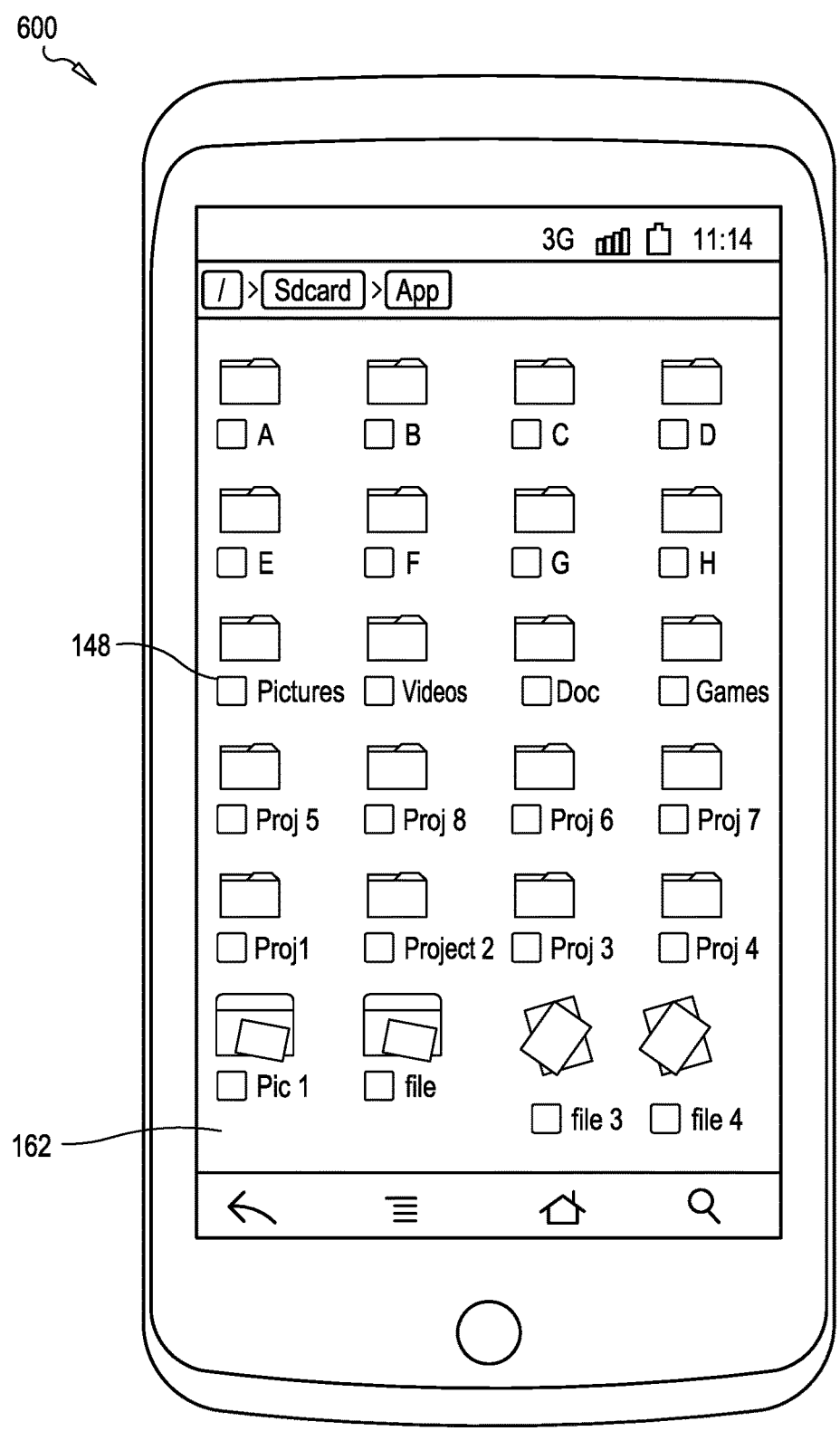

FIGS. 6A-6B are exemplary embodiments of the system 600 of the invention in use according to one embodiment. Secure app 110 is configured for storing and cataloguing concealed data 168 within a hidden directory 162 in a hidden data category 166 that would otherwise correspond to the at least one content 112 in its viewable state.

Figure 7A:
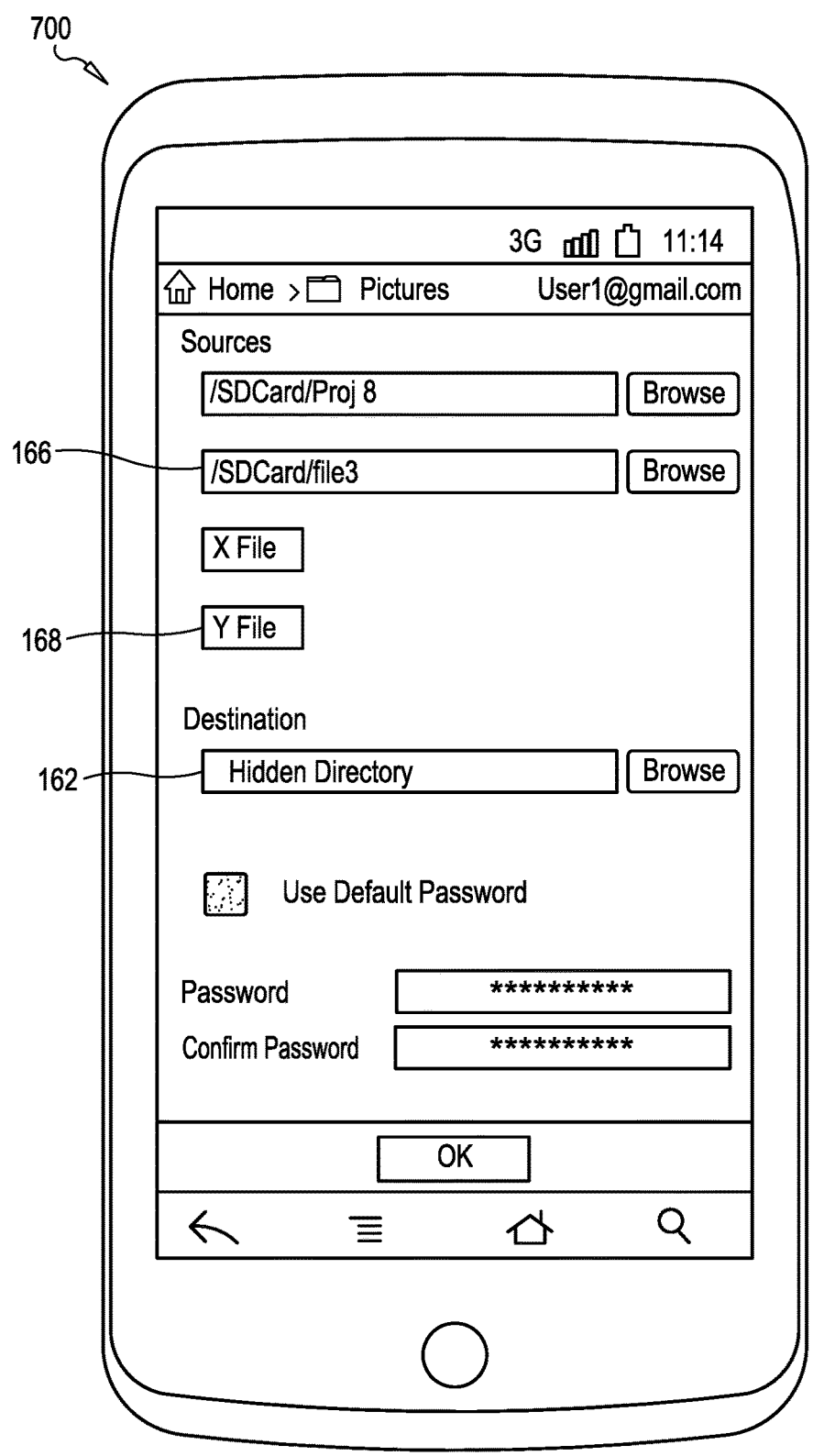
FIGS. 7A-7C are exemplary embodiments of the system of the invention in use according to one embodiment.
Figure 7B:
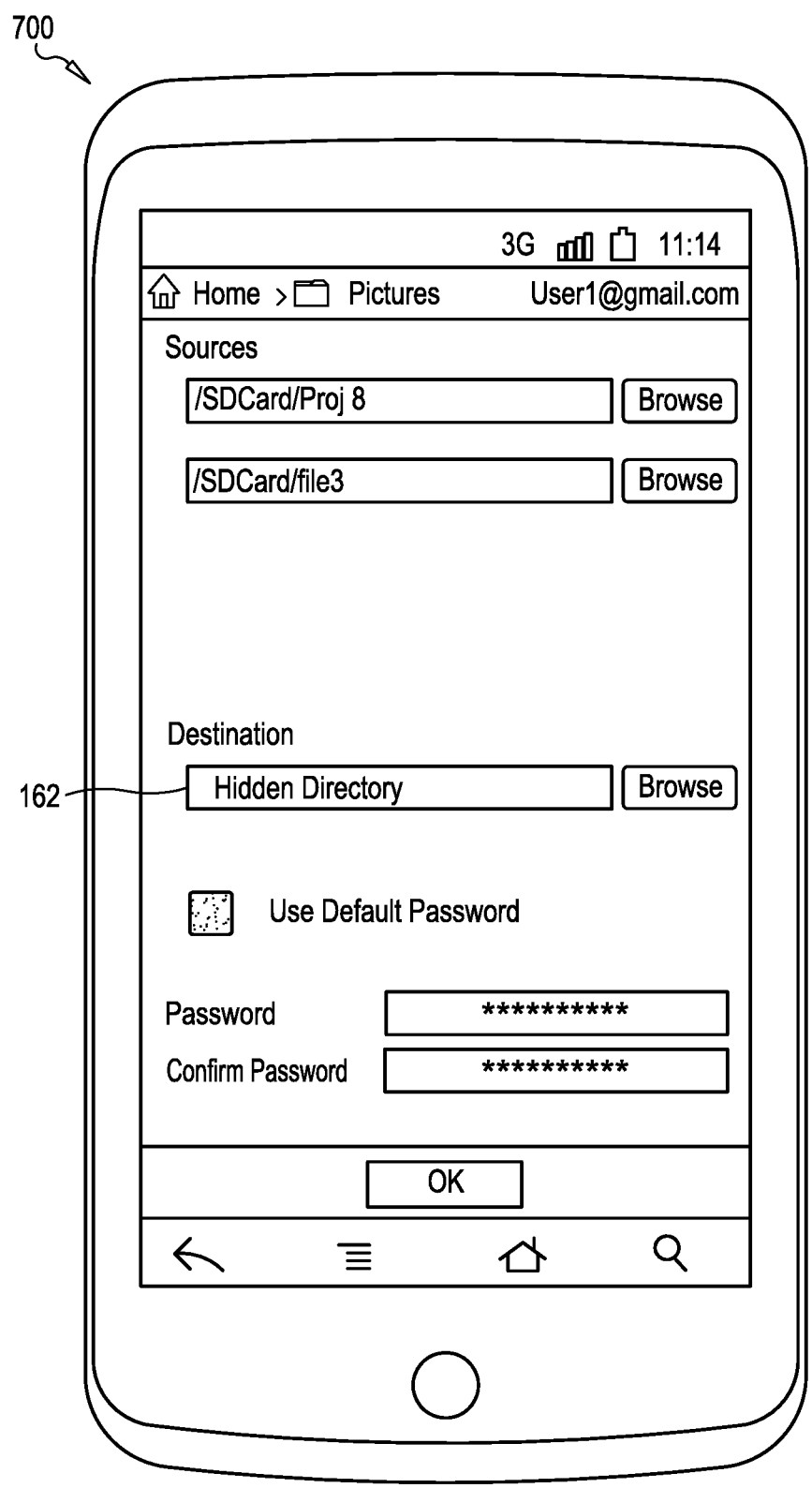
Figure 7C:
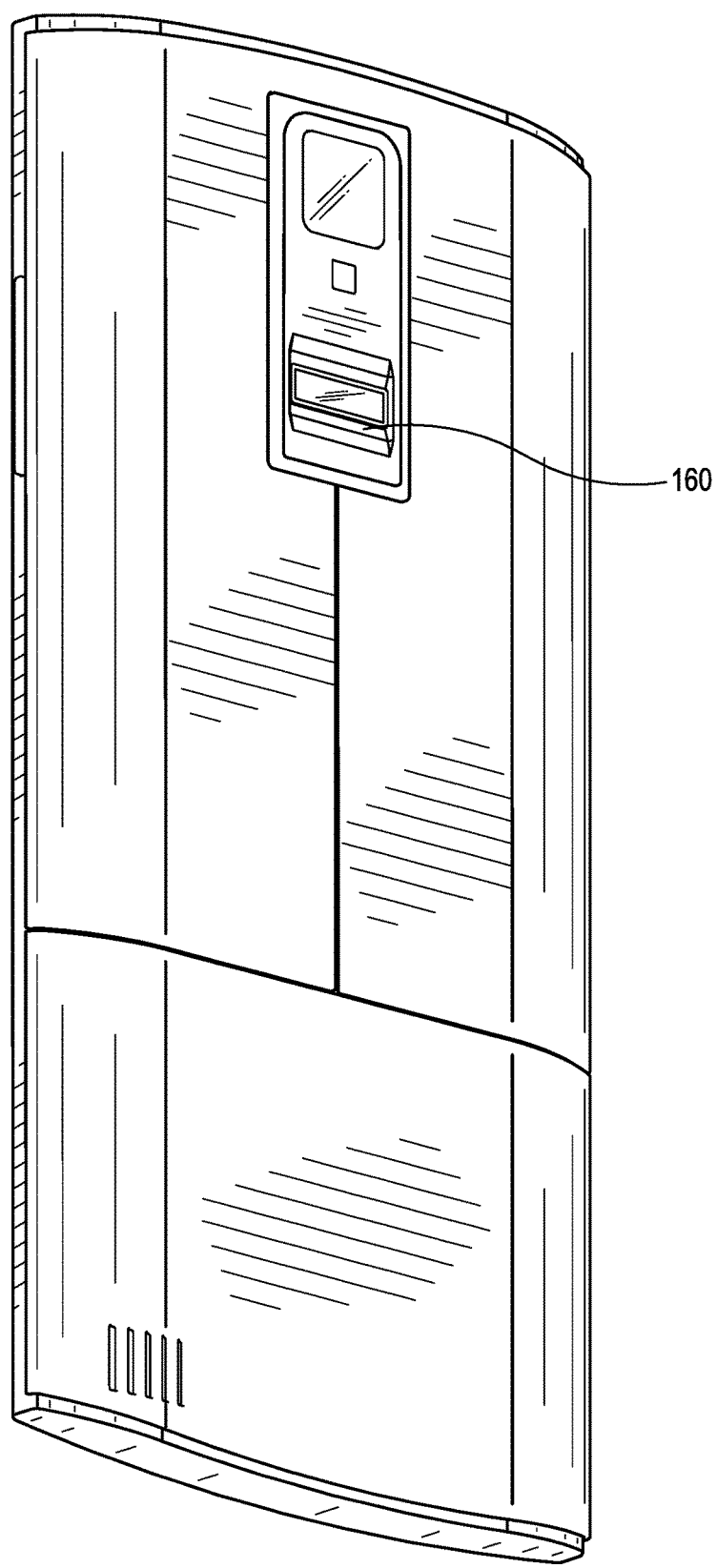

FIGS. 7A-7C are exemplary embodiments of the system 700 of the invention in use according to one embodiment. Biometric verification module 160 as shown in FIG. 7C may exist on the device 100 or may comprise of a self-contained computer removably attached hardware device, e.g. a verification dongle 160. Once the dongle 160 is connected or activated for authentication of the user, all existing open ports are closed providing for a secure environment for the user to access, edit and/or transmit sensitive proprietary documentation in a secure session 111.

As shown in FIG. 7C, the biometric verification module 160 is permanently affixed to the device 102 where the user's identity may be authenticated, e.g. as shown herein includes a processor in electronic communication with a fingerprint scanner to receive the user's biometric sample, i.e. a fingerprint. The biometric sample is reduced to electronic data that is scrambled to create a random algorithm that is converted into a one-time password automatically used to authenticate the individual. Once the user is approved, all currently open ports are closed allowing for the creation of a secure environment and the user may engage in accessing, and/or editing secure documentation as well as transmitting the same over a secure access port until the task is finished.

The concealed data 168 and hidden data category 166 stored in the hidden directory 162 loses none of its editable functions by residing in the hidden directory 162 as secure app 110 is configured for receiving editing commands within the hidden directory 162 to effectuate edits (save, adding, deleting, copying, moving, play, rewind, pause, fast forward, and the like) to the concealed data 168 and the hidden data category 166.

Methods

Figure 8:
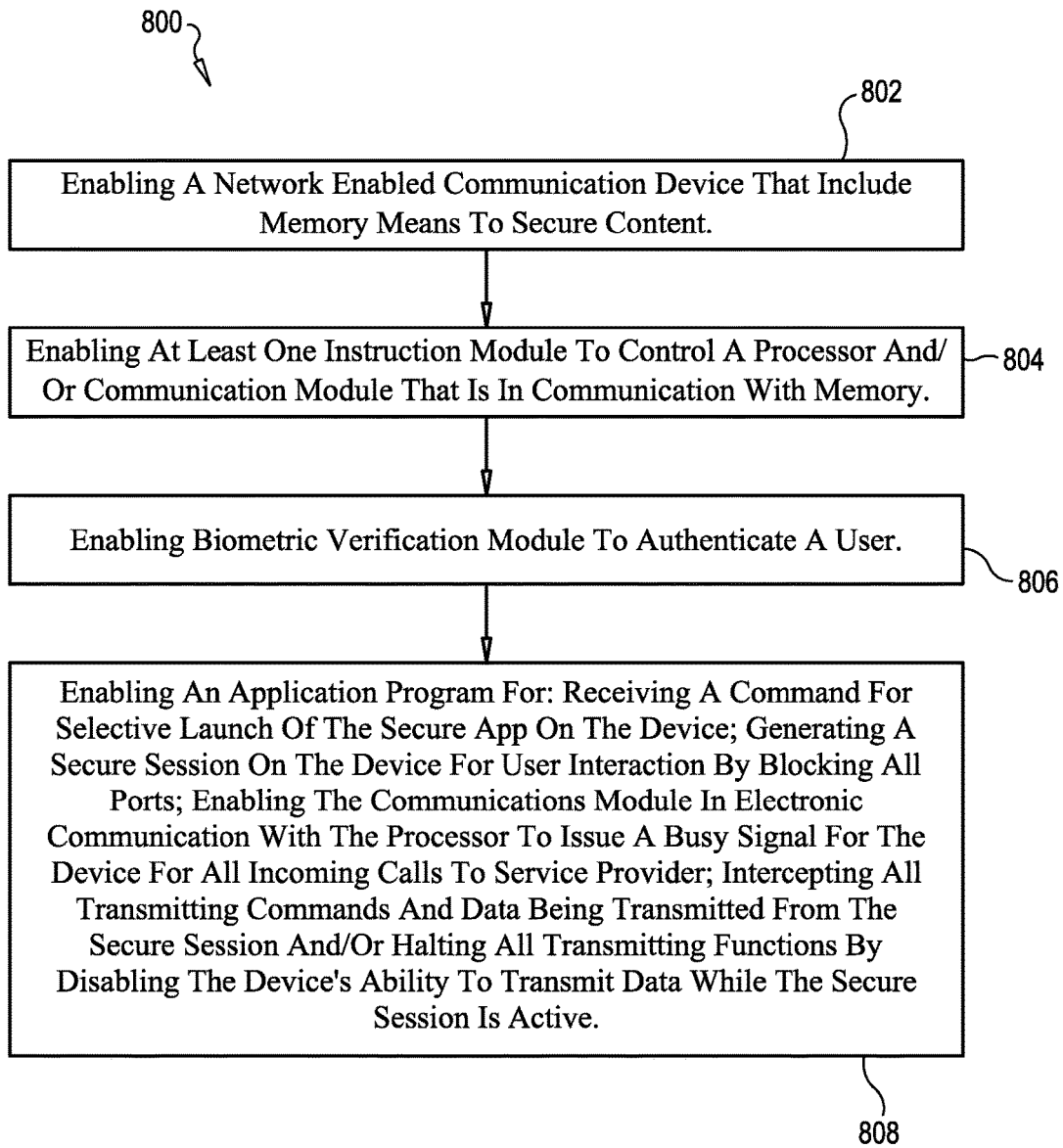
FIG. 8 is exemplary method according to one embodiment of the invention.

Referring now to FIG. 8, a block diagram depicting a computer-implemented method 800 of securing content comprising enabling a network enabled communication device that include memory 108 to secure content (step 802); enabling at least one instruction module to control a processor and/or communication module that is in communication with memory 108 (step 804); enabling biometric verification module to authenticate a user (step 806); enabling an application program comprising of computer executable instructions, executable by the processor and configured for performing any one or more of the following: receiving a command for selective launch of the secure app 110 on the device 102; generating a secure session 111 on the device 102 for user interaction by blocking all ports; enabling the communications module 152 in electronic communication with the processor to perform any one or more of the following: issue a busy signal for the device 102 for all incoming calls to the service provider if the secure session 111 is active; intercept all transmitting commands and data being transmitted from the secure session 111 wherein the data being transmitted from the secure session 111 is intercepted and prevented from being transmitted until notification is provided via the device's display to user for confirmation of the cessation of the secure session 111 if the data is to be transmitted; and/or halting all transmitting functions by disabling the device's 102 ability to transmit data while the secure session 111 is active (step 810).

User has the option to encrypt the content 112 as opposed to hiding the content 112 created from the secure data of the secure session 111 using the secure app 110, which may encrypt either the at least one content 112 or the data category 114 as per the user's selection. If the user opts to encrypt the at least one content 112 or the data category 114, the encrypted at least one content 112 is stored with the non-encrypted content 112 within the data category 114. Similarly, if user chooses to encrypt the data category 114, the encrypted data category 114 is stored with other non-encrypted data category 114.

In some embodiments, some or all of the system functions previously described herein may be accomplished by a processor and/or its processing module on the device 102.

In some embodiments, method 800 further comprises receiving editing commands within the secure session to effectuate edits to the secure data; storing and cataloguing secure data as concealed data within a hidden directory in a hidden data category that would otherwise correspond to the at least one content; and/or terminating the secure session by unblocking all ports.

Method 800 further comprises enabling the communications module for selectively transmitting secure data from the secure session; to cease issuing a busy signal to all incoming calls if the secure session is inactive; or enabling the communications module to resume all transmitting functions by enabling the network enabled communication device's ability to transmit data if the secure session has been deactivated.

Figure 9:
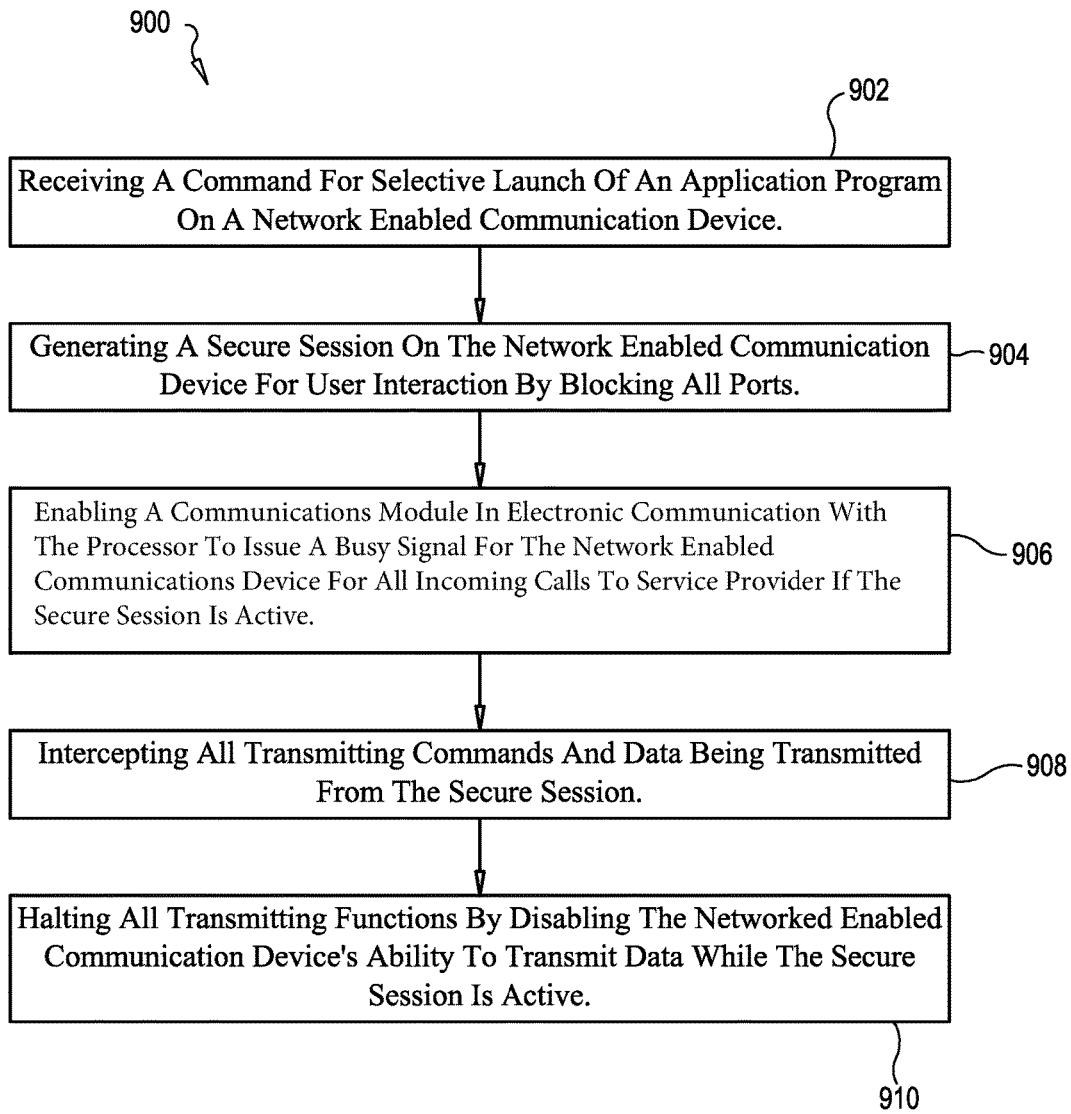
FIG. 9 is exemplary method according to one embodiment of the invention.

FIG. 9 shows a block diagram depicting a non-transitory computer readable medium 900 is shown in accordance with one embodiment, wherein computer readable medium 900 may comprise of computer logic, i.e. computer executable instructions 902 readable by at least one processor 904 and operative to perform any or all of the following steps or functions: receiving a command for selective launch of the secure app 110 on the device 102; generating a secure session 111 on the device 102 for user interaction by blocking all ports; enabling the communications module 152 in electronic communication with the processor to issue a busy signal for the device 102 for all incoming calls to service provider if the secure session 111 is active; intercepting all transmitting commands and data being transmitted from the secure session 111 wherein the data being transmitted from the secure session 111 is intercepted and prevented from being transmitted until notification is provided via the device's display to user for confirmation of the cessation of the secure session 111 if the data is to be transmitted; and/or halting all transmitting functions by disabling the device's 102 ability to transmit data while the secure session 111 is active.

In some embodiments, the at least one processor 904 may be part of or integrated into a network enabled communication device. In some embodiments, the device 102 may comprise a mobile phone, a tablet PC, a smartphone, a laptop, and the like.

In one embodiment, the computer executable instructions 902 may be stored, in whole or in part, remotely, such as in a server or central station, or locally, such as in the mobile communications device. In some embodiments, the central station may comprise any type of central station, such as those described above with reference to FIGS. 1 through 8.

Non-transitory computer readable medium 900 may comprise any type non-transitory computer readable medium, such as, but not limited to, a hard drive, a flash drive, a solid state drive, computer memory, a compact disc, a DVD, and the like. Computer readable medium 900 may comprise any of the various embodiments described herein, wherein the computer readable medium is configured for accomplishing those various embodiments such as those described with reference to FIGS. 1A through 8.

In some embodiments, computer executable instructions 902 may comprise the various embodiments of computer executable instructions described herein, such as those described above with reference to FIGS. 1-8. Computer executable instructions 902 may be part of, used in, or be included in the various systems and methods described herein.

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
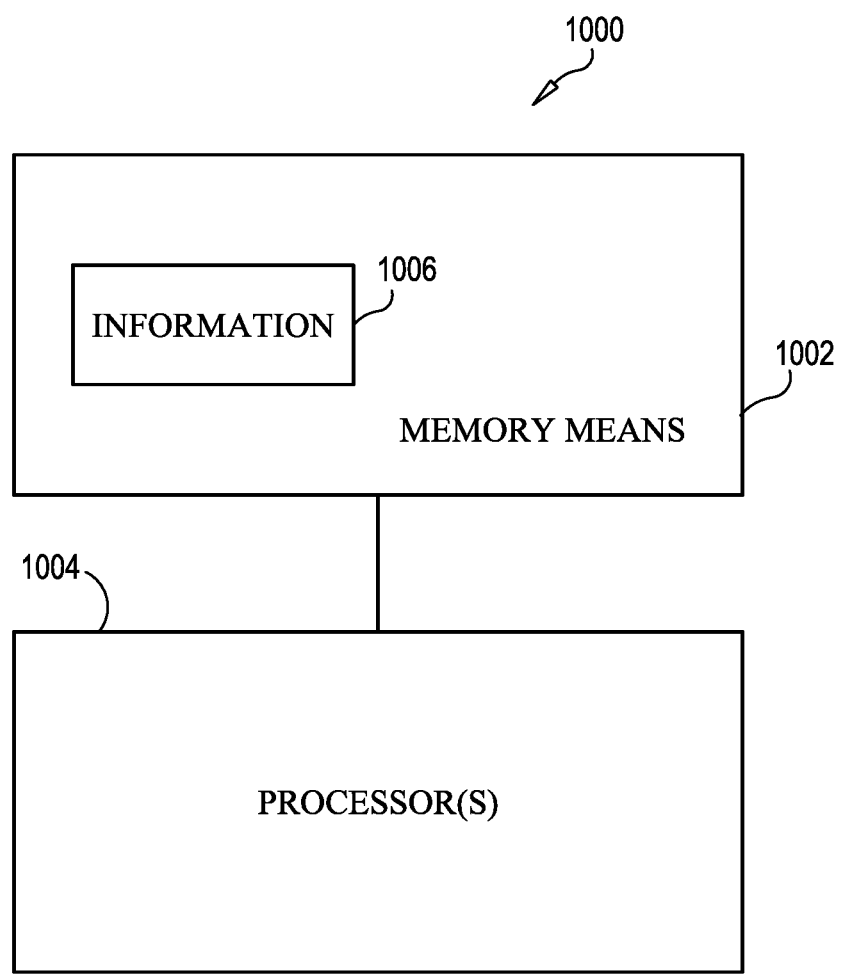
FIG. 10 is a block diagram representing an apparatus according to various embodiments.

FIG. 10 is a block diagram representing an apparatus 1000 according to various embodiments. Such embodiments may comprise a computer, a memory system, a magnetic or optical disk, some other storage device, or any type of electronic device or system. The apparatus 1000 may include one or more processor(s) 1004 coupled to a machine-accessible medium such as a memory 1002 (e.g., a memory including electrical, optical, or electromagnetic elements). The medium may contain associated information 1004 (e.g., computer program instructions, data, or both) which, when accessed, results in a machine (e.g., the processor(s) 1004) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
a networked enabled communication device that includes memory;
at least one processor disposed in communication with the memory;
a biometric verification module that authenticates a user's biometric sample; and
an application program stored in the memory, executed by the at least one processor and performs the following:
authenticating the user when the user's biometric sample matches the user's stored biometric identifier;
generating a secure session for user interaction by blocking all network ports and denying any incoming transmissions from interrupting the secure session;
enabling a communications module to issue a busy signal for the network enabled communications device for all incoming calls to service provider when the secure session is active, in response to generating a secure session based on receiving a command for selective launch of the application program;
enabling the communications module to intercept all transmitting commands and data being transmitted from the secure session;
enabling the communications module to halt all transmitting functions by disabling the networked enabled communication device's ability to transmit data while the secure session is active;
converting at least one content into concealed data;
storing the concealed data within a hidden directory, wherein the hidden directory is wholly unavailable for display anywhere on a display of the networked enabled communication device;
displaying a hidden data category upon receiving an alternate command and verifiable user's authentication information;
terminating the secure session; and
enabling the communications module to resume all transmitting functions by enabling the communications module.

2. The system of claim 1, wherein the application program enables the communications module to provide notification via the networked enabled communication's display to user for confirmation of the cessation of the secure session.

3. The system of claim 1, wherein authenticating the user's biometric sample includes any one or more of the following: receiving the user's biometric sample, and validating the biometric sample with at least one or more biometric identifiers stored thereon.

4. The system of claim 1, wherein the application program receives editing commands within the secure session to effectuate edits to secure data.

5. The system of claim 1, wherein the application program enables the communications module for selectively transmitting secure data from the secure session once the secure session is terminated.

6. The system of claim 1, wherein the application program performs any or more of the following:
displaying a plurality of data categories while excluding the hidden data category from the display;
terminate the secure session by unblocking all network ports; or
enabling the communications module to cease issuing a busy signal to all incoming calls if the secure session is inactive.

7. The system of claim 1, wherein the application program encrypts any one or more of the following: the at least one content or a data category.

8. The system of claim 1, wherein the application program restores the concealed data from the hidden directory by reconverting the concealed data to the at least one content making it available for display.

9. A computer-implemented method of securing content comprising:
enabling a network enabled communication device that includes memory to secure content;
enabling at least one instruction module to control a processor and/or communication module that is in communication with the memory;
enabling a biometric verification module to authenticate a user's biometric sample;
enabling an application program stored in the memory, executed by the processor and performs the following:
authenticating the user when the user's biometric sample matches the user's stored biometric identifier;
generating a secure session on the network enabled communication device for user interaction by blocking all network ports and denying any incoming transmissions from interrupting the secure session;
enabling the communications module in electronic communication with the processor to issue a busy signal for the network enabled communications device for all incoming calls to service provider when the secure session is active, in response to generating a secure session based on receiving a command for selective launch of the application program;
enabling the communications module to intercept all transmitting commands and data being transmitted from the secure session;
enabling the communications module to halt all transmitting functions by disabling the networked enabled communication device's ability to transmit data while the secure session is active;
converting at least one content into concealed data;
storing the concealed data within a hidden directory, wherein the hidden directory is wholly unavailable for display anywhere on a display of the networked enabled communication device;
displaying a hidden data category upon receiving an alternate command and verifiable user's authentication information;
terminating the secure session; and
enabling the communications module to resume all transmitting functions by enabling the communications module.

10. The computer implemented method of claim 9, further comprising providing notification via the networked enabled communication's display to user for confirmation of the cessation of the secure session.

11. The computer implemented method of claim 9, further comprising receiving editing commands within the secure session to effectuate edits to secure data.

12. The computer implemented method of claim 9 further comprising enabling the communications module for selectively transmitting secure data from the secure session once the secure session is terminated.

13. The computer implemented method of claim 9 further comprising:

displaying a plurality of data categories while excluding the hidden data category from the display;

terminating the secure session by unblocking all network ports; or enabling the communications module to cease issuing a busy signal to all incoming calls if the secure session is inactive.

14. A non-transitory computer readable medium comprising control logic for causing a computer processor to perform any or all of the following steps or functions:

authenticating the user when the user's biometric sample matches the user's stored biometric identifier;

generating a secure session on the network enabled communication device for user interaction by blocking all network ports and denying any incoming transmissions from interrupting the secure session;

enabling a communications module in electronic communication with the processor to issue a busy signal for the network enabled communications device for all incoming calls to service provider if the secure session is active, in response to generating a secure session based on receiving a command for selective launch of the application program;

enabling the communications module to intercept all transmitting commands and data being transmitted from the secure session;

enabling the communications module to halt all transmitting functions by disabling the networked enabled communication device's ability to transmit data while the secure session is active;

converting at least one content into concealed data;

storing the concealed data within a hidden directory, wherein the hidden directory is wholly unavailable for display anywhere on a display of the networked enabled communication device;

displaying a hidden data category upon receiving an alternate command and verifiable user's authentication information;

terminating the secure session; and enabling the communications module to resume all transmitting functions by enabling the communications module.

15. The non-transitory computer readable medium of claim 14, further comprising control logic that provides notification via the networked enabled communication's display to user for confirmation of the cessation of the secure session.

16. The non-transitory computer readable medium of claim 14, further comprising control logic that receives editing commands within the secure session to effectuate edits to secure data.

17. The non-transitory computer readable medium of claim 14, further comprising control logic that selectively transmits secure data from the secure session once the secure session is terminated.

18. The non-transitory computer readable medium of claim 14 further comprising control logic for:

displaying a plurality of data categories while excluding the hidden data category from the display;

terminating the secure session by unblocking all network ports; or enabling the communications module to cease issuing a busy signal to all incoming calls if the secure session is inactive.

* * * * *